US011016051B1

(12) United States Patent
Sinko et al.

(10) Patent No.: US 11,016,051 B1
(45) Date of Patent: May 25, 2021

(54) WIRELESS SENSORS FOR USE IN POLYMERS TO MEASURE THE STRUCTURAL INTEGRITY OF THE SAME AND METHODS OF MANUFACTURE THEREOF

(71) Applicant: Materials Technology Institute, Inc., St. Louis, MO (US)

(72) Inventors: Robert Sinko, Kingsport, TN (US); Chris Heaton, Atlanta, GA (US); Brian English, Atlanta, GA (US); Heather Allain, Mont Vernon, NH (US)

(73) Assignee: Materials Technology Institute, Inc. (MTI), St. Louis, MO (US)

( * ) Notice: Subject to any disclaimer, the term of this patent is extended or adjusted under 35 U.S.C. 154(b) by 247 days.

(21) Appl. No.: 16/170,720

(22) Filed: Oct. 25, 2018

Related U.S. Application Data

(60) Provisional application No. 62/576,840, filed on Oct. 25, 2017.

(51) Int. Cl.
*G01N 27/24* (2006.01)
*B32B 5/02* (2006.01)
(Continued)

(52) U.S. Cl.
CPC .............. *G01N 27/24* (2013.01); *B32B 5/024* (2013.01); *B32B 5/26* (2013.01); *B32B 17/067* (2013.01);
(Continued)

(58) Field of Classification Search
CPC .......... G01N 27/24; H01Q 7/00; B32B 5/024; B32B 27/322; B32B 17/067; B32B 5/26; B32B 2262/101; B32B 2439/40
(Continued)

(56) References Cited

U.S. PATENT DOCUMENTS 6,785,616 B2   8/2004 Lung et al.
7,392,715 B2   7/2008 Moore et al.
(Continued)

FOREIGN PATENT DOCUMENTS

WO   2010055282 A1   5/2010
WO   2013086626 A1   6/2013
(Continued)

OTHER PUBLICATIONS

Hufenbach, W et al., "Damage monitoring in pressure vessels and pipelines based on wireless sensor networks," ScienceDirect: Procedia Engineering 10 (2011) 340-345; 6 pages.
(Continued)

*Primary Examiner* — Farhana A Hoque
(74) *Attorney, Agent, or Firm* — Morris, Manning & Martin, LLP; Daniel E. Sineway, Esq.

(57) ABSTRACT

In various embodiments, the disclosed wireless sensors comprise chemically-sensitive conductor traces that respond to variations in the polymer surrounding the sensors due to the change in proximity of the chemicals stored within the polymer vessels (e.g., degradation of the structural integrity of the polymer vessel). The sensors may generally be installed at the interface between the corrosion barrier and the structural layers of a polymer vessel comprising any FRP, PTFE, plastic, or other polymers. As the chemical stored within the polymer vessel degrades or permeates the corrosion barrier, the impedance measured by the sensor, in one embodiment, changes, which signals a change in the structural integrity of the polymer in which the sensor is embedded.

42 Claims, 15 Drawing Sheets

(51) Int. Cl.
*B32B 5/26* (2006.01)
*B32B 27/32* (2006.01)
*H01Q 7/00* (2006.01)
*B32B 17/06* (2006.01)

(52) U.S. Cl.
CPC ............ *B32B 27/322* (2013.01); *H01Q 7/00* (2013.01); *B32B 2262/101* (2013.01); *B32B 2439/40* (2013.01)

(58) Field of Classification Search
USPC ........................................ 324/641; 250/222.2
See application file for complete search history.

(56) References Cited

U.S. PATENT DOCUMENTS

| | | | |
|---|---|---|---|
| 7,414,416 B2 | 8/2008 | Watkins, Jr. et al. | |
| 7,581,439 B2 | 9/2009 | Rensel et al. | |
| 7,581,456 B2 | 9/2009 | Moore et al. | |
| 7,612,325 B1 * | 11/2009 | Watkins, Jr. ........... | G01N 27/12 250/221 |
| 7,659,728 B1 | 2/2010 | Watkins, Jr. | |
| 7,663,381 B2 | 2/2010 | Watkins, Jr. et al. | |
| 7,832,263 B2 | 11/2010 | Rensel et al. | |
| 7,921,727 B2 | 4/2011 | Rice | |
| 7,963,180 B2 | 6/2011 | Moore et al. | |
| 7,977,952 B2 | 7/2011 | Krutz et al. | |
| 7,990,156 B1 | 8/2011 | Watkins, Jr. | |
| 8,217,669 B1 | 7/2012 | Watkins | |
| 8,264,347 B2 | 9/2012 | Castleman | |
| 8,286,473 B2 | 10/2012 | Rensel et al. | |
| 8,829,929 B1 | 9/2014 | Watkins, Jr. | |
| 9,028,772 B2 | 5/2015 | Yao et al. | |
| 2010/0026300 A1 * | 2/2010 | Klein ..................... | G01N 22/00 324/316 |
| 2011/0199102 A1 * | 8/2011 | Garcia ............... | G01N 27/4148 324/658 |
| 2015/0293039 A1 * | 10/2015 | Herbsommer ......... | G01N 22/00 324/641 |

FOREIGN PATENT DOCUMENTS

| | | |
|---|---|---|
| WO | 2015200723 A1 | 12/2015 |
| WO | 2017069969 A1 | 4/2017 |

OTHER PUBLICATIONS

Frias, et al., "Manufacturing and testing composite overwrapped pressure vessels with embedded sensors," ScienceDirect: Materials and Designs: Materials and Design 31 (2010) 4016-4022; 7 pages.

\* cited by examiner

WIRELESS SENSORS FOR USE IN POLYMERS TO MEASURE THE STRUCTURAL INTEGRITY OF THE SAME AND METHODS OF MANUFACTURE THEREOF

CROSS REFERENCE TO RELATED APPLICATIONS

This application claims priority to, the benefit under 35 U.S.C. § 119 of, and incorporates by reference herein in its entirety U.S. Provisional Patent Application No. 62/576,840, filed Oct. 25, 2017, and entitled "Wireless Sensors for Use in Polymers to Measure the Structural Integrity of the Same and Methods of Manufacture Thereof."

TECHNICAL FIELD

The present disclosure relates generally to wireless sensors and, more particularly, to wireless sensors embedded in polymers to detect degradation of the structural integrity of the polymers.

BACKGROUND

Fiber reinforced polymers (also referred to herein as "FRP," "fiberglass reinforced polymers," "glass reinforced polymers," etc.) generally are a versatile engineered material consisting of layers of structural glass fibers and reinforcement veil embedded in a thermoset polymer matrix. Within each layer, the fiber design, polymer chemistry, and polymer-to-glass percentage are designed for specific needs, such as structural strength or chemical resistance. The combined effects of each layer can be designed into a bulk FRP structure to meet performance needs. For example, FRP storage tanks include several outer layers for structural strength (e.g., woven glass fiber, chopped strands with high glass loading, etc.) with inner veil layers for the corrosion barrier. This versatility and control of FRP performance makes it a suitable and cost-effective material for many industries and applications.

FRP and other plastics/polymers (e.g., polytetrafluoroethylene, etc.) have found acceptance in corrosive environments because they provide excellent chemical resistance, structural strength, and value. Unlike common metals (e.g., steel, stainless steel, etc.), polymers can withstand prolonged attack in chlorinated and acidic environments at cheaper costs as compared to chemical resistant metals, such as high-nickel or refractory alloys. The challenge with using polymers for chemical storage, however, is that the chemicals can degrade the polymers through permeation, corrosion, and erosion. For example, some chemicals will dissolve and degrade the polymer surface, while some solvents can diffuse or permeate through the polymer corrosion barrier leading to swelling, softening, delamination, and other effects that reduce the integrity of the structure. Chemical attack on the polymers creates environmental exposure risks that limit the lifetime of the polymer equipment and requires expensive and complicated inspection and maintenance procedures to ensure the structural integrity of the polymers. Currently, to inspect polymer equipment and piping to ensure their structural integrity, the containers must be emptied out periodically to visually inspect and/or conduct tests on the corrosion barrier within the container, which is expensive, dangerous, inefficient, and time consuming.

Therefore, there is a long-felt but unresolved need for an apparatus or method by which the structural integrity of the polymers can be monitored remotely/externally without the need to empty the containers in which a relevant chemical is being stored.

BRIEF SUMMARY OF THE DISCLOSURE

Briefly described, and according to one embodiment, aspects of the present disclosure generally relate to wireless sensors embedded in polymers to detect degradation and assess the condition of the integrity of the polymers.

In various embodiments, the disclosed wireless sensors comprise chemically-sensitive conductor traces (e.g., a chemically-sensitive capacitor in the center surrounded by a loop antenna, etc.) that respond to impedance and/or capacitance variations in the polymer (e.g., FRP, polytetrafluoroethylene, other plastics/polymers, etc.) surrounding the sensors due to the change in proximity of the chemicals stored within the polymer vessels (e.g., due to the degradation of the structural integrity of the polymer vessel, etc.). In one embodiment, the sensors generally have no wires, batteries, or electronic chips that could malfunction or require replacement. In one embodiment, the sensors comprise an RFID chip that harvests its power wirelessly from an RF interrogator, which, in various embodiments, receives data from the interrogator, does not receive data from the interrogator, and/or transmits back data to the interrogator. Furthermore, in one embodiment, the RFID chip may interface with an external sensor or built-in sensor (external/internal to the wireless sensor itself) that detects of changes of the surrounding environment through, for example, modification of the electromagnetic permeability (e.g., epsilon relative) through humidity, water pressure, and/or temperature. The wireless sensor may comprise or be in communication with other sensors, for example, temperature to support data analysis (e.g., temperature-related effects in the impedance change). Data received from the interrogator may be used to address the RFID-based sensor or configure it. In one embodiment, the data sent to the interrogator may comprise sensor data and/or a unique RFID chip identifier. In one embodiment, the sensors are fabricated using thin-film processes similar to those employed in flexible circuit board fabrication. Alternative fabrication methods generally include those processes used in manufacture of direct write sensors and printed circuit board (e.g., "PCB") fabricated sensors. The specific structure of a particular sensor generally depends on the desired information regarding the structural integrity of the polymer (e.g., barrier failure, corrosion, permeation, pitting, temperature, etc.) that the sensor will detect and the vessel into which the sensor will be embedded.

The sensors are generally embedded at the interface between the corrosion barrier and the structural layers of a polymer vessel or a dual laminate vessel with a polymer inner layer (e.g., used in chemical processing, oil and gas, water and waste water treatment, semi-conductor, transportation, pulp and paper, energy production industries, chemical storage, fuel storage, etc.) comprising any FRP, PTFE, plastic, or other polymer. To collect data from the sensors, in one embodiment, a handheld reader held near a particular sensor (but typically outside of a vessel within which the sensor is embedded) transmits radio frequency (e.g., "RF") power to the sensor, which powers the sensor to transmit data, and then receives and processes the data transmitted by the sensor. As the chemical (e.g., aqueous, anhydrous materials, liquid, vapor, or gases) stored within the polymer vessel degrades and/or permeates the corrosion barrier, the impedance of the polymer changes, as measured by a change in the capacitance of the circuit that is in contact with the polymer (e.g., due to differences in the dielectric constant of the polymers as compared to the chemicals, etc.), and this change in capacitance/impedance signals a change in the structural integrity of the polymer in which the sensor is embedded. Thus, the sensors embedded in the various polymers may generally detect information regarding the structural integrity of the polymer using various techniques.

Exemplary applications of the disclosed sensors generally include embedding behind a polymer in a dual laminate construction of polymer and FRP, embedding behind a polymer in a dual laminate construction of polymer and metallic backing (e.g., carbon steel, stainless steel, etc.), embedding the sensors within a thermoset structure (e.g., FRP, etc.) at layers behind the corrosion barrier or within the corrosion barrier layer at different depths, and embedding the sensors within a thermoplastic. As will occur to one having ordinary skill in the art, this disclosure places no limitations on the applications for the disclosed sensors. The disclosed sensors are generally designed to monitor the integrity and condition of equipment (e.g., thermoplastic or thermoset polymer, etc.) and give an indication of when the equipment has been permeated or otherwise breached such that the chemical process fluid (material) has come in contact or proximity with the device.

In one embodiment, a system for monitoring structural integrity of a polymer container storing or transporting a fluid, comprising: the polymer container; and one or more sensors embedded in the polymer container for monitoring the structural integrity of the polymer container, wherein each of the one or more sensors comprises: a chemically-sensitive capacitor; and an antenna comprising a particular resonance frequency, wherein each of the one or more sensors responds to close proximity of the fluid by changing the particular resonance frequency or ceasing to transmit at the particular resonance frequency.

In one embodiment, a method for monitoring structural integrity of a polymer container storing or transporting a chemical, comprising: accessing one or more sensors in the polymer container, wherein each of the one or more sensors comprises: a chemically-sensitive capacitor; and an antenna comprising a particular resonance frequency, wherein each of the one or more sensors responds to close proximity of the chemical by changing the particular resonance frequency or ceasing to react at the particular resonance frequency; and reading each of the one or more sensors to detect whether the particular resonance frequency has changed or whether at least one of the one or more sensors has ceased to react at the particular resonance frequency.

According to one aspect of the present disclosure, the system, wherein each of the one or more sensors consists of the chemically-sensitive capacitor and the antenna. Furthermore, the system, wherein each of the one or more sensors comprises an LC resonant sensor or a RFID wireless sensor. Moreover, the system, wherein each of the one or more sensors is configured to detect high dielectric gradients of the fluid. Further, the system, wherein each of the one or more sensors is configured to detect a change in impedance of the polymer container. Additionally, the system, wherein each of the one or more sensors is configured to measure failure of a corrosion barrier of the polymer container, corrosion of the polymer container, permeation of the polymer container, pitting of the polymer container, or temperature of the polymer container. Also, the system, wherein the polymer container comprises polytetrafluoroethylene ("PTFE") or fiberglass reinforced polymers.

According to one aspect of the present disclosure, the system, wherein the polymer container comprises a storage container, a barrel, a fuel tank, or a pipe. Furthermore, the system, wherein the one or more sensors are embedded at an interface between a corrosion barrier of the polymer container and a structural layer of the polymer container. Moreover, the system, further comprising a reader for detecting the particular resonance frequency, wherein the reader is hand-held, permanently mounted on the polymer container, or mounted on a remote sensing device. Further, the system, wherein each of the one or more sensors is less than 0.01 inches thick. Additionally, the system, wherein each of the one or more sensors is less than 0.005 inches thick. Also, the system, wherein each of the one or more sensors covers a surface area less than 2.0 in2.

According to one aspect of the present disclosure, the system, wherein each of the one or more sensors covers a surface area less than 1.0 in2. Furthermore, the system, wherein the chemically-sensitive capacitor and the antenna comprise approximately 0.001 inch-thick copper conductors. Moreover, the system, wherein the particular resonance frequency of the antenna in air is less than 70 MHz. Further, the system, wherein the particular resonance frequency of the antenna in air is approximately 50 MHz. Additionally, the system, wherein the fluid comprises hydrofluoric acid, sulfuric acid, oleum, phosgene, hydrochloric acid, nitric acid, ammonia, bases, oxidizing and reducing acids, organic compounds, or a mixture thereof.

According to one aspect of the present disclosure, the method, wherein each of the one or more sensors consists of the chemically-sensitive capacitor and the antenna. Also, the method, wherein each of the one or more sensors comprises an LC resonant sensor or a RFID wireless sensor. Furthermore, the method, wherein each of the one or more sensors is configured to detect high dielectric gradients of the fluid. Moreover, the method, wherein each of the one or more sensors is configured to detect a change in impedance of the polymer container. Further, the method, wherein each of the one or more sensors is configured to measure failure of a corrosion barrier of the polymer container, corrosion of the polymer container, permeation of the polymer container, pitting of the polymer container, or temperature of the polymer container. Additionally, the method, wherein the polymer container comprises fiberglass reinforced polymers and a chemically-resistant liner, wherein the chemically-resistant liner comprises polytetrafluoroethylene ("PTFE"), perflyoroalkoxy ("PFA"), ethylene tetra fluoro ethyleye ("ETFE"), polypropylene ("PP"), high-density polyethyleye ("HDPE"), or chemically-resistant resins.

According to one aspect of the present disclosure, the method, wherein the polymer container comprises a storage container, a barrel, a fuel tank, or a pipe. Also, the method, further comprising the step of, prior to accessing the one or more sensors, embedding the one or more sensors in the polymer container at an interface between a corrosion barrier of the polymer container and a structural layer of the polymer container. Furthermore, the method, wherein reading each of the one or more sensors further comprises reading each of the one or more sensors with a reader for detecting the particular resonance frequency, wherein the reader is hand-held, permanently mounted on the polymer container, or mounted on a drone. Moreover, the method, wherein each of the one or more sensors is less than 0.01 inches thick. Further, the method, wherein each of the one or more sensors is less than 0.005 inches thick. Additionally, the method, wherein each of the one or more sensors covers a surface area less than 2.0 in2.

According to one aspect of the present disclosure, the method, wherein each of the one or more sensors covers a surface area less than 1.0 in2. Also, the method, wherein the chemically-sensitive capacitor and the antenna comprise approximately 0.001 inch-thick copper conductors. Furthermore, the method, wherein the particular resonance frequency of the antenna in air is less than 70 MHz. Moreover, the method, wherein the particular resonance frequency of the antenna in air is approximately 50 MHz. Further, the method, wherein the chemical comprises hydrofluoric acid, sulfuric acid, oleum, phosgene, hydrochloric acid, nitric acid, ammonia, bases, oxidizing and reducing acids, organic compounds, or a mixture thereof. Additionally, the method, wherein the RFID wireless sensor is interrogated by an RF signal in a determined frequency band that is independent of the particular resonance frequency.

According to one aspect of the present disclosure, the method, wherein the RFID wireless sensor is interrogated by the RF signal using wave propagation. Also, the method, wherein the determined frequency band comprises 840-930 MHz. Furthermore, the method, wherein the RFID wireless sensor is interrogated by the RF signal using inductive coupling. Moreover, the method, wherein the determined frequency band comprises 125 kHz, 134.2 kHz, or 13.56 MHz. Further, the method, wherein data transfer between the reader and each of the one or more sensors occurs via backscatter. Additionally, the method, wherein data transfer between the reader and each of the one or more sensors occurs via load modulation.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment. It should be understood that the drawings herein are for exemplary purposes only and provide non-limiting examples of one or more embodiments of the present disclosure.

DETAILED DESCRIPTION

Figure 1A:
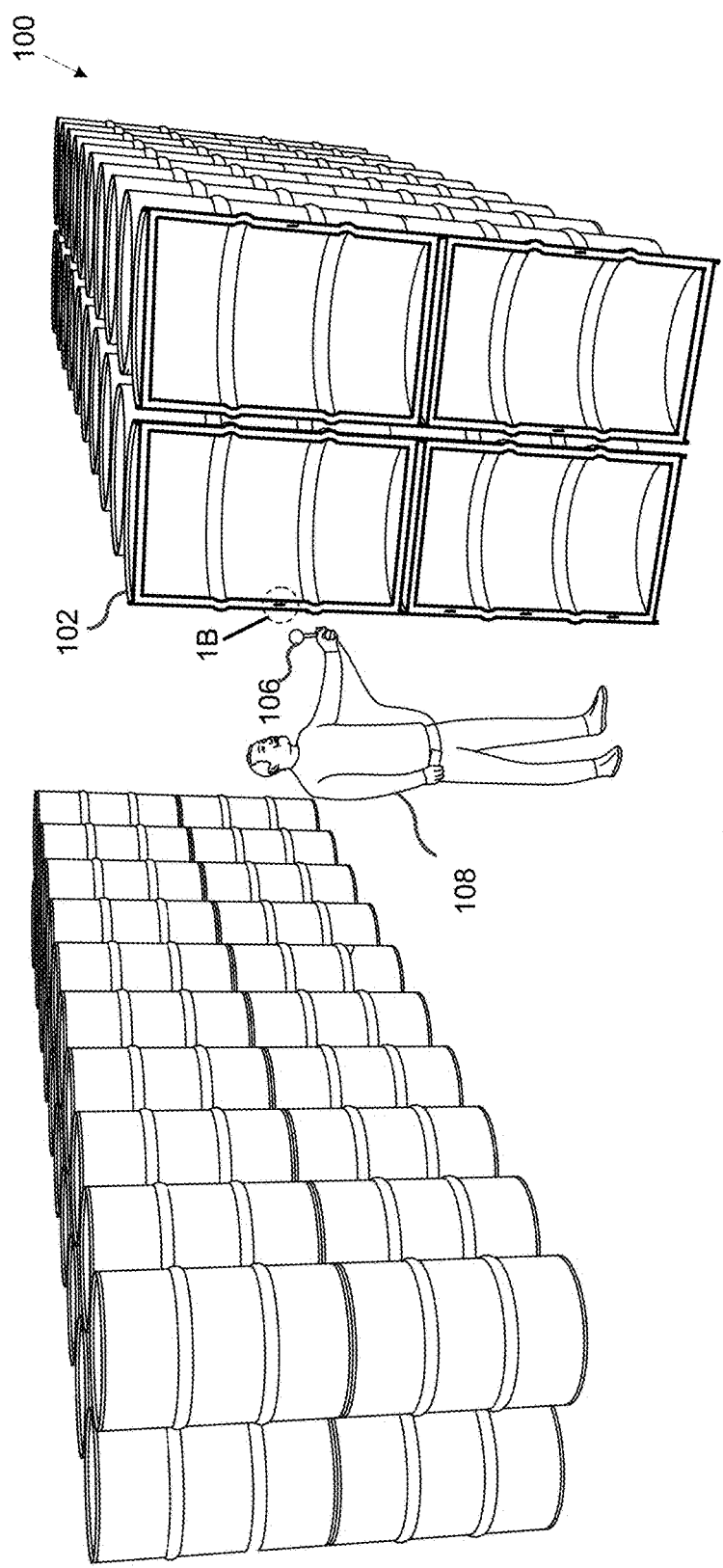
FIG. 1 (consisting of FIGS. 1A and 1B) illustrates an exemplary, high-level overview of the system, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

As will be understood by one having ordinary skill in the art, the steps and processes described herein may operate concurrently and continuously, are generally asynchronous and independent, and are not necessarily performed in the order discussed.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

Overview

Aspects of the present disclosure generally relate to wireless sensors embedded in polymers to detect degradation and assess the condition of the integrity of the polymers.

In various embodiments, the disclosed wireless sensors comprise chemically-sensitive conductor traces (e.g., a chemically-sensitive capacitor in the center surrounded by a loop antenna, etc.) that respond to impedance and/or capacitance variations in the polymer (e.g., FRP, polytetrafluoroethylene, other plastics/polymers, etc.) surrounding the sensors due to the change in proximity of the chemicals stored within the polymer vessels (e.g., due to the degradation of the structural integrity of the polymer vessel, etc.). In one embodiment, the sensors generally have no wires, batteries, or electronic chips that could malfunction or require replacement. In one embodiment, the sensors comprise an RFID chip that harvests its power wirelessly from an RF interrogator. In one embodiment, the sensors are fabricated using thin-film processes similar to those employed in flexible circuit board fabrication. Alternative fabrication methods generally include those processes used in manufacture of direct write sensors and printed circuit board (e.g., "PCB") fabricated sensors. The specific structure of a particular sensor generally depends on the desired information regarding the structural integrity of the polymer (e.g., barrier failure, corrosion, permeation, pitting, temperature, etc.) that the sensor will detect and the vessel into which the sensor will be embedded.

The sensors are generally embedded at the interface between the corrosion barrier and the structural layers of a polymer vessel or a dual laminate vessel with a polymer inner layer (e.g., used in chemical processing, oil and gas, water and waste water treatment, semi-conductor, transportation, pulp and paper, energy production industries, chemical storage, fuel storage, etc.) comprising any FRP, PTFE, plastic, or other polymer. To collect data from the sensors, in one embodiment, a handheld reader held near a particular sensor (but typically outside of a vessel within which the sensor is embedded) transmits radio frequency (e.g., "RF") power to the sensor, which powers the sensor to transmit data, and then receives and processes the data transmitted by the sensor. As the chemical (e.g., aqueous, anhydrous materials, liquid, vapor, or gases) stored within the polymer vessel degrades and/or permeates the corrosion barrier, the impedance of the polymer changes, as measured by a change in the capacitance of the circuit that is in contact with the polymer (e.g., due to differences in the dielectric constant of the polymers as compared to the chemicals, etc.), and this change in capacitance/impedance signals a change in the structural integrity of the polymer in which the sensor is embedded. Thus, the sensors embedded in the various polymers may generally detect information regarding the structural integrity of the polymer using various techniques.

Exemplary applications of the disclosed sensors generally include embedding behind a polymer in a dual laminate construction of polymer and FRP, embedding behind a polymer in a dual laminate construction of polymer and metallic backing (e.g., carbon steel, stainless steel, etc.), embedding the sensors within a thermoset structure (e.g., FRP, etc.) at layers behind the corrosion barrier or within the corrosion barrier layer at different depths, and embedding the sensors within a thermoplastic. As will occur to one having ordinary skill in the art, this disclosure places no limitations on the applications for the disclosed sensors. The disclosed sensors are generally designed to monitor the integrity and condition of equipment (e.g., thermoplastic or thermoset polymer, etc.) and give an indication of when the equipment has been permeated or otherwise breached such that the chemical process fluid (material) has come in contact or proximity with the device.

Exemplary Embodiments

Figure 1B:
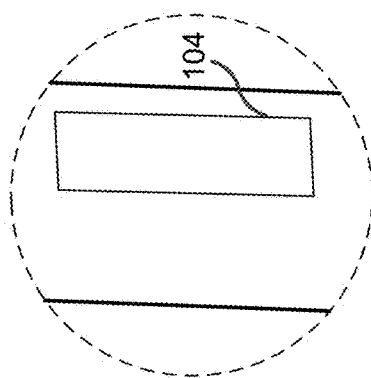

Referring now to the figures, for the purposes of example and explanation of the fundamental processes and components of the disclosed systems and methods of manufacture thereof, reference is made to FIG. 1, consisting of FIGS. 1A and 1B, which illustrates an exemplary, high-level overview 100 of one embodiment of the present disclosure. As will be understood and appreciated, the overview shown in FIG. 1 represents merely one approach or embodiment of the present system, and other aspects are used according to various embodiments of the present system. Generally, for exemplary discussion purposes, the present disclosure refers to storage of chemicals in vessels 102 comprising FRP or other materials. As should be understood, chemical storage is only one exemplary use case of the disclosed system; this disclosure places no limitations on the applications of the disclosed sensors 104 (e.g., chemical transport, structural integrity of physical structures such as bridges, food safety, etc.) but does generally refer, in this section and throughout, to exemplary use cases involving chemical storage and processing for ease and consistency of reference.

In various embodiments, exemplary wireless sensors 104 are embedded within one or more industrial polymer containers or vessels 102 for monitoring the structural integrity of the same (shown in more detail in the exploded view in FIG. 1B). As will be understood from the discussions herein, the industrial polymer containers 102 may be barrels, drums, pails, storage tanks, distillation columns, reactors, pipes, valves, etc. located in any physical/geographic location (e.g., above ground, below ground, inside, outside, underwater, etc.) regardless of the environmental factors impacting the same (e.g., temperature, humidity, etc.). In one embodiment, the industrial polymer containers 102 are embedded with an array of wireless sensors 104 during manufacture of the containers 102. In an alternate embodiment, the wireless sensors 104 are embedded into the layers of preassembled polymer containers 102. Further details of the sensor manufacture and installation processes will be discussed in association with the description of FIGS. 3, 4 and 7.

During normal use, stored chemicals dissolve, erode, or permeate through the vessel 102 over time, which can result in failure of the vessel 102. The embedded sensors 104 generally respond to changes in the surrounding material of the vessel 102, for example by changing transmission frequency or ceasing transmission entirely, to indicate when a vessel 102 has been compromised or when the stored chemicals have reached a certain proximity (e.g., 0.1 mm, 1 mm, 2 mm, 10 mm, 15 mm, etc.) from the sensor 104. Thus, the embedded sensors 104 enabling monitoring of the structural integrity of the vessels 102 without emptying the vessel or other dangerous/costly inspection methods.

To gather data regarding a vessel 102 from a sensor 104, a user 108 operates a handheld reader 106, in various embodiments, that transmits RF power to the wireless sensor 104 and then receives, processes, and uploads the return data from the sensor 104. According to various aspects of the present disclosure, the user 108 may be a human (e.g., maintenance technician, manager, etc.) or machine (e.g., drone, unmanned aerial vehicle, robot, etc.). In one embodiment, without receiving power from the handheld reader 106, the wireless sensors 104 do not transmit data. The handheld reader 106 generally comprises an interrogator, an antenna, and a portable user interface (not shown). In various embodiments, the interrogator powers the wireless sensors 104 by transmitting RF energy via the antenna and records the response from the wireless sensors 104 via the antenna (generally displaying status of the process via the portable user interface). The interrogator is generally coupled to the wireless sensor 104 via near-field magnetic coupling between the opposing loop antennae. This magnetic coupling is a near-field phenomenon with a current range on the order of the interrogator antenna diameter (e.g., a 2" diameter antenna can read sensors 2" away, etc.). In one embodiment, the data received from a wireless sensor 104 is transferred from the handheld reader to an electronic computing device (e.g., smart phone, tablet, laptop, etc.) over a wired or wireless connection (e.g., Bluetooth®, Wi-Fi, etc.). As will occur to one having ordinary skill in the art, this disclosure places no limitations on the type of handheld sensor 106 that may be used with the disclosed wireless sensors 104.

In one exemplary scenario, a company deploying the disclosed system embeds an array of wireless sensors 104 into industrial polymer containers 102 during manufacture before the containers 102 are put into service and chemicals are introduced to the environment. After a period of time, continuing with this example, a technician 108 scans the exterior of a container 102 with the handheld reader 106 to collect data regarding the integrity of the container 102 from the sensor(s) 104 embedded therein. The data is transferred to a data management service (e.g., a cloud/SaaS service, an on-premise service, etc.), with alerts generated if or when further attention is required (e.g., due to degradation of a corrosion barrier, etc.). Generally, the data management service may provide detailed data regarding the container 102, including historical data, a prognosis of remaining time until replacement, etc.

In an alternative scenario, instead of a handheld reader 106, a reader would be permanently installed on the exterior of the container 102 for continuous monitoring of the wireless sensors 104 embedded therein. Continuing with this example, the installed reader 106 could have a communications interface (e.g., using cellular wireless, Wi-Fi, or other data) that permits the collected data to be uploaded to the data management service. For example, a company deploying the disclosed system may embed an array of wireless sensors 104 into fuel storage tanks 102 that would be stored underground (e.g. gas tanks at a gas station, etc.); thus, the interrogator and antenna may be installed on the tank, but the user interface may be above ground so that the tanks do not have to be disturbed to read the sensors 104.

Figure 2:
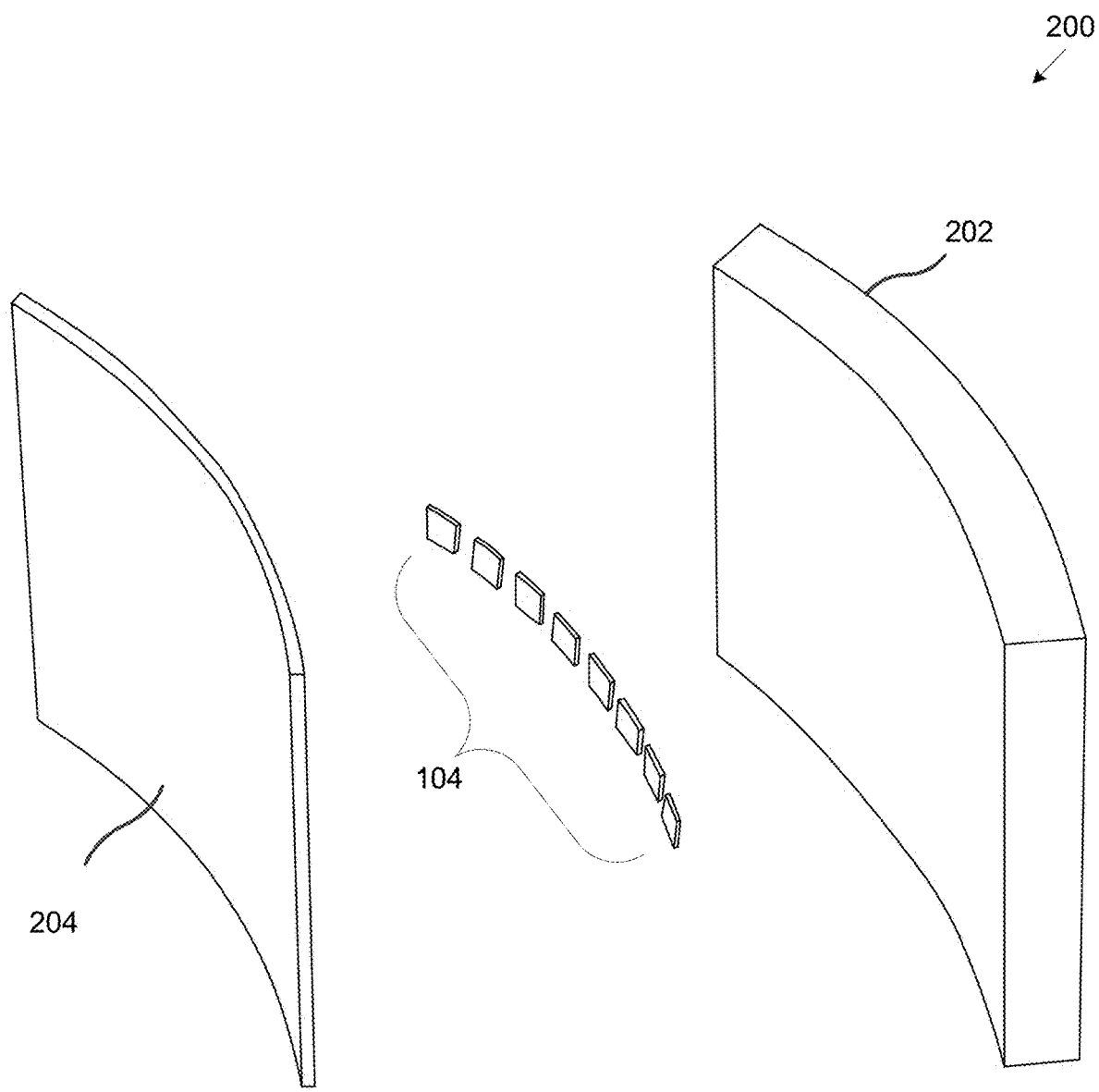
FIG. 2 illustrates an exemplary exploded side view of embedded sensors, according to one embodiment of the present disclosure.

Now referring to FIG. 2, an exploded view 200 of embedded sensors 104 is shown according to one embodiment of the present disclosure. Generally, the sensors 104 (further details of which will be discussed in association with the description of FIG. 4) are embedded between a structural layer 202 and a corrosion barrier layer 204 of a vessel (e.g., container 102 from FIG. 1) to monitor the structural integrity of the same.

The structural layer 202 generally forms the outermost layer(s) of an industrial polymer container, serving to provide the general shape and strength of the container. Generally, the structural layer 202 should not come into contact with the materials stored in the container. The structural layer 204, in various embodiments, is constructed from materials with properties that are heavy weight, ideal for multi-layer hand lay-up applications, strong, and (in some cases) corrosion resistant. Examples of these materials include, but are not limited to chopped strand mat, woven ring, C-Veil fiberglass, resins, various polymers, etc.

Generally, the corrosion barrier layer 204 forms the innermost layer(s) of an industrial polymer container, preventing intrusion therein or other structural degradation thereof by the chemicals stored in the industrial polymer container. The corrosion barrier layer 204 is generally exposed to and comes into contact with any type of hazardous waste materials and/or chemicals, oils, and various types of gases. The corrosion barrier layer 204 is constructed from materials with properties that are corrosion/seepage resistant, have compressed strength, and may exhibit a long surface life (e.g., C-Veil fiberglass, resin mixtures, polymers, fluoropolymers, or other chemically resistant non-metallics, etc.).

Figure 3:
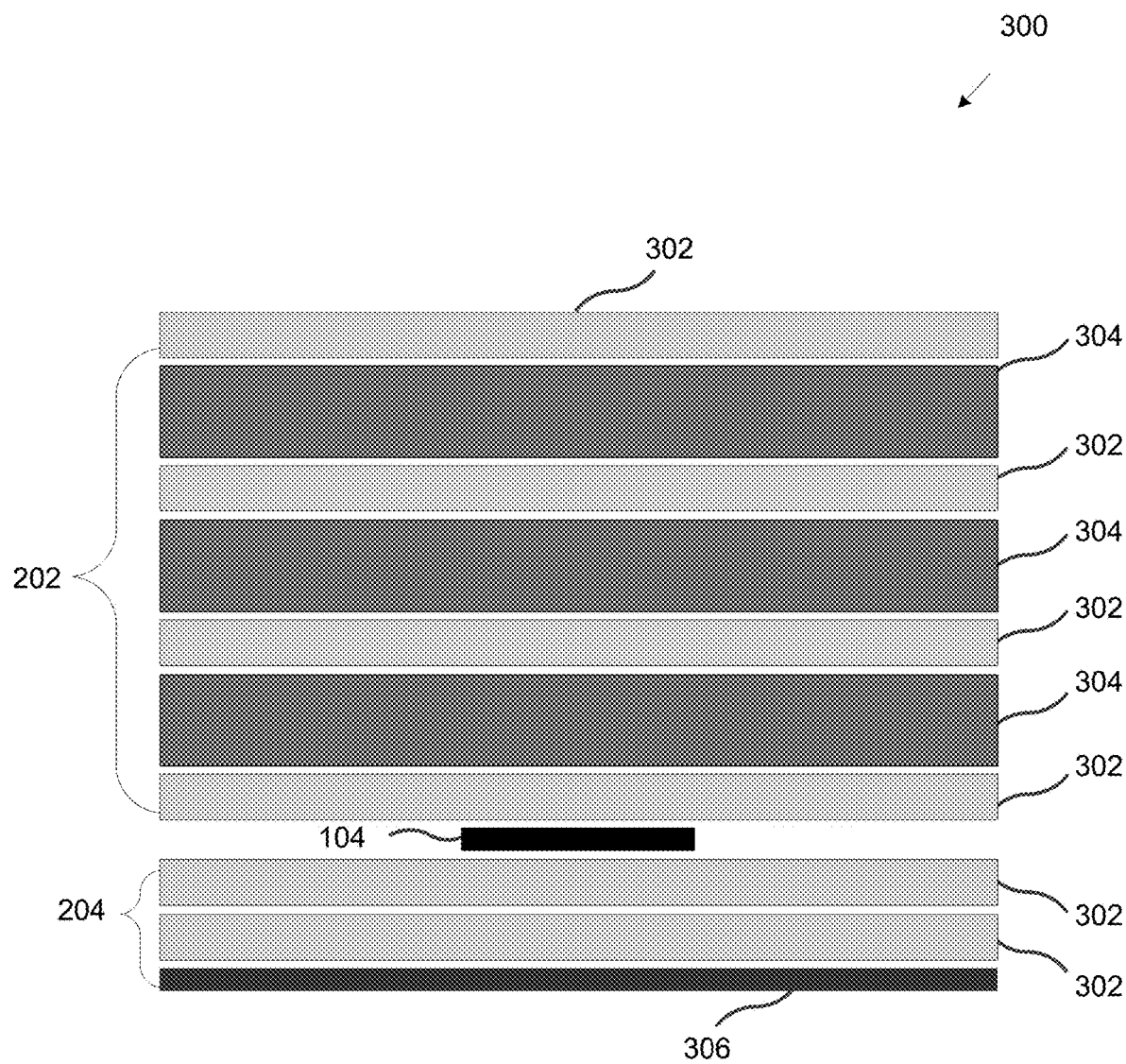
FIG. 3 illustrates a cross-sectional view of an exemplary, embedded wireless sensor, according to one embodiment of the present disclosure.

Now referring to FIG. 3, a cross-sectional view 300 of embedded wireless sensors 104 is shown according to one embodiment of the present disclosure. In one embodiment, the structural layer 202 comprises one or more layers of chopped strand mat 302 and one or more layers of woven roving 304. Further, in one embodiment, the corrosion barrier layer 204 may comprise one or more layers of chopped strand mat 302, as well as one or more layers of a corrosion resistant material 306 (e.g., C-Veil, Nexus Veil, etc.). Generally, the number of layers of chopped strand mat 302 and woven roving 304 will depend on the desired properties of the container (e.g., strength, thickness, etc.). In one embodiment, the layers of chopped strand mat 302 and woven roving 304 alternate (as shown in FIG. 3). In another embodiment (not shown in FIG. 3), multiple layers of chopped strand mat 302 are placed together between layers of woven roving 304. In another embodiment (not shown in FIG. 3), multiple layers of woven roving 304 are placed together between layers of chopped strand mat 302. Generally, although gaps are shown for illustration purposes, it should be understood that the final manufactured vessel will generally contain no gaps or air pockets; accordingly, the sensors 104 are completely covered/encapsulated by the surrounding polymer (e.g., chopped strand mat 302, etc.).

In various embodiments, the chopped strand mat 302 comprises a fabric used for building thickness for parts between layers of fabric. Generally, the chopped strand mat 302 may be used in conjunction with woven roving material 304 to form the structural layer 202 or behind the corrosion resistant material 306 to form the corrosion barrier layer 204. This disclosure places no limitations on the type of material used for the chopped strand mat 302. In one embodiment, chopped strand mat 302 may be manufactured by Fibre Glast Developments Corporation, of Brookville, Ohio.

The continuous glass fiber material woven roving 304, in various embodiments, comprises a heavy weight fabric for the use of multi-layer hand lay-up applications where great material strength is required. Generally, the woven roving 304 may be used in conjunction with the chopped strand mat 302 to form the structural layer 202. This disclosure places no limitations on the type of material used for the woven roving 304. In one embodiment, woven roving 304 may be manufactured by Fiberglass Supply, of Burlington, Wash.

In various embodiments, the corrosion resistant material 306 improves the corrosion resistance, compressive strength, permeation resistance, and surface life of the container into which it is installed by preventing contact between the structural layer 202 and the chemicals stored therein. Thus, the corrosion resistant material 306 is usually the inner-most layer of the corrosion barrier layer 204 (installed, in one embodiment, on top of the chopped strand mat 302). This disclosure plays no limitations on the type of material used for the corrosion resistant material 306. In one embodiment, the corrosion resistant material 306 may comprise C-Veil fiberglass.

Figure 4:
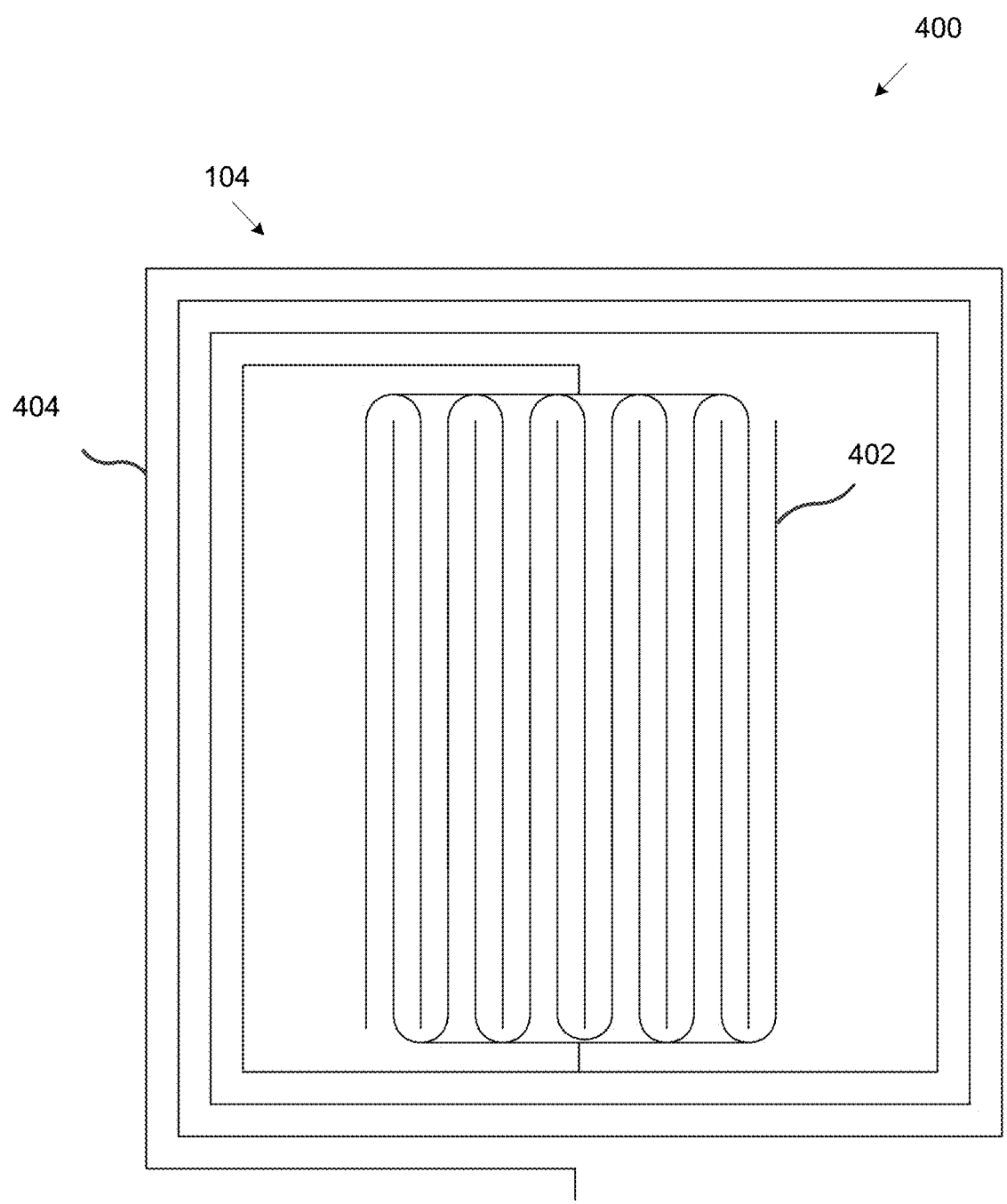
FIG. 4 illustrates a top view of an exemplary sensor, according to one embodiment of the present disclosure.

Referring now to FIG. 4, a top view 400 of a wireless sensor 104 is shown according to one embodiment of the present disclosure. In various embodiments, the sensor comprises a chemically-sensitive capacitor 402 and a loop antenna 404, wherein the capacitance of the wireless sensor varies with its proximity to chemicals. In one embodiment, the wireless sensors comprise no wires, batteries, or electronic chips and rely on LC resonance or radio frequency (also referred to herein as "RF") to wirelessly measure degradation of a polymer. The antenna 404, in various embodiments, enables wireless reading and transmits at a set frequency response that is impacted by the capacitor 402, which powers the antenna 404 and responds to changes in the surrounding materials. In one embodiment, the wireless sensor may respond to near-field changes in the material into which it is embedded, with a sensing range of less than 0.020 inches. The design of the capacitor 402 and antenna 404 are generally provide reasonable accuracy with less than 10% error.

In various embodiments, although not shown in FIG. 4, a RFID chip is included on the sensor to respond to RF excitation from an interrogator and to return a signal to the interrogator. The RFID chip may comprise a unique identifier to permit selection or identification of a particular sensor for communication. For example, the unique identifier allows a system to distinguish between multiple sensors and furthermore, if a map of the sensor locations is available, it immediately allows the detection of the impacted position of the vessel in order to do a time/effort-effective location based action (e.g., a local replacement, fixing only, etc.). RFID generally have read ranges in excess of 10 meters, which allows a very effective identification and quick scan of a complete vessel, either with handhelds and/or a portal reader (interrogator) or portals with multiple integrators on both sides of the vessel. Furthermore, in one embodiment, the RFID chip may interface with an external sensor or built-in sensor (external/internal to the wireless sensor itself) that detects of changes of the surrounding environment through, for example, modification of the electromagnetic permeability (e.g., epsilon relative) through humidity, water pressure, and/or temperature. The interrogator, however, does not need to change its operating frequency, as the resonance frequency of the tag as required for operation remains unchanged. RFID chips generally operate in the RFID bands—typically ISM-bands (Industrial, Scientific and Medical Band) that are available globally (e.g., 902-928 MHz (UHF) and 13.56 MHz (HF)), which is an advantage compared to resonance frequency scans that would require a wider frequency range for operations that are generally unavailable in open RF bands.

The wireless sensors, in one embodiment, are flexible, less than 0.003 inches thick, and have a footprint less than 1.0 in$^2$. In an alternate embodiment, the sensors are any thickness (e.g., 0.01 inches, 0.001 inches, 0.1 inches, etc.) and have any size footprint (e.g., 2.0 in$^2$, 4.0 in$^2$, 8.0 in$^2$, etc.) depending on the intended application of the sensor.

In one embodiment, an array of wireless sensors may be embedded into the layers of a polymer container during manufacture. In various embodiments, a single wireless sensor may be embedded into the layers of a polymer container. The wireless sensors, in various embodiments, are fabricated using thin-film processes similar to those employed in the fabrication of flexible circuit boards. Alternative fabrication methods generally include those processes used in manufacture of direct write sensors and printed circuit board (e.g., "PCB") fabricated sensors. Sensors, in one embodiment, may be fabricated on approximately 0.002 inch thick polyimide substrates with approximately 0.0007 inch thick copper conductors. Sensors, in various embodiments, may be fabricated via direct printing of metal conductors on polyimide, paper, rubber, and other materials.

In various embodiments, the wireless sensors are embedded between the corrosion barrier layers 204 and the structural layers 202 of a vessel so as to determine when the corrosion barrier is no longer efficacious. In one embodiment, as the layers of the vessel are formed, the wireless sensors are embedded into the vessel by placing the sensors between corrosion barrier layers 204 and the structural layers 202 during vessel construction. In one embodiment, the wireless sensors 104 are embedded by cutting into the wall of an already-constructed vessel to a predetermined depth (e.g., the depth of the corrosion barrier layer 204), inserting the sensor(s), and sealing the sensor(s) into the vessel wall (e.g., with a patch that is of a predetermined thickness and material such as the same material and thickness as the structural layer 202 of the vessel).

Exemplary applications of the disclosed sensors generally include embedding behind a polymer in a dual laminate construction of polymer and FRP, embedding behind a polymer in a dual laminate construction of polymer and metallic backing structural layer such as carbon steel or stainless steel, embedding within a thermoset structure (such as FRP) at layers behind the corrosion barrier 204 or within the corrosion barrier layer 204 at different depths, and embedding within a thermoplastic. As will occur to one having ordinary skill in the art, this disclosure places no limitations on the applications for the disclosed sensors.

In various embodiments, the wireless sensor may be resonant and/or responsive at a specific frequency. In one embodiment, the wireless sensor may not return complex data but may simply transmit a signal (e.g., at a specific frequency) that indicates the corrosion barrier is still functional (e.g., "yes" it is working). In one embodiment, the wireless sensor changes the frequency of the reaction or ceases the reaction to indicate that the corrosion barrier 202 has been compromised (e.g., "no" it is no longer functional). In one embodiment, the response to the corrosion barrier's 202 failure depends on the structure of the wireless sensor (e.g., if the antenna is built in a way that it would not be exposed to the chemicals—on the back side of the substrate, then the sensor will continue transmitting, etc.). Once fabricated, the exemplary wireless sensor may have a resonant frequency of approximately 50.28 MHz in air. In one embodiment, the exemplary wireless sensor may have any resonant frequency in air (e.g., 20 MHz, 30 MHz, 40 MHz, 50 MHz, 60 MHz, 70 MHz, 80 MHz, etc.), wherein the frequency may be determined by the intended use of the sensor. In various embodiments, the frequency depends on the size, shape, and structure of both the capacitor 402 and antenna 404.

The loop antenna 404, of inductance, L, and the capacitor 402, of capacitance, C, form a resonant circuit of frequency, f:

$$f = \frac{1}{2\pi}\sqrt{\frac{1}{LC}}$$

The loop antenna 404 may generally be thought of as fixed (e.g., the resonant circuit frequency of the antenna will not change absent a change in the environment in which the antenna is embedded), so, in various embodiments, both frequency and capacitance provide chemical permeation information—generally, frequency decreases as capacitance increases. For convenience, in this disclosure, the resonant frequency of the antenna is listed as the wireless sensor response rather than converting to capacitance. This response frequency generally impacts reader architecture, complexity and cost. Increasing sensor frequency generally increases RF noise in electronics and may require significant non-recurring engineering to match impedance in transmission lines to reduce noise. Also, increasing frequency, in various embodiments, may increase the operational and timing demands on the electronics of the handheld reader 106, which often limits component selection to fewer high-performance parts on the market.

In various embodiments, the sensor capacitor 402 varies with the dielectric constant of the surrounding material. Generally, the polymers used in chemical storage containers typically have a dielectric constant between 3.7 and 4.2, whereas the stored chemicals typically have a dielectric constant greater than 20. As the capacitance of the sensors is proportional to the dielectric constant, an increase in capacitance of the sensor from installation to complete failure occurs (e.g., when the sensor is installed in the polymer, it transmits at a frequency proportional to the dielectric constant of the polymers, whereas when the chemical barrier fails and the sensor comes into contact with the stored chemicals, the sensor transmits at a frequency that is proportional to the dielectric constant of the stored chemicals). In one embodiment, the shift in capacitance of the sensors is of 5x magnitude. By tracking this capacitance change, the sensor, in one embodiment, may determine the remaining corrosion barrier thickness, permeation rate, and remaining life. An "alert point" in the sensor's response (e.g., a particular frequency) may, in various embodiments, indicate critical thickness, wear rate, or other impending action items.

The inductance, L, of the planar spiral antenna 404 is a function of the number of turns in the antenna, n, the outer diameter of the antenna, $D_o$, and the inner diameter of the antenna, $D_i$, as given by the following equation for constants $K_1$ and $K_2$:

$$L = K_1 \frac{n^2 d_{avg}}{1 + K_2 \rho},$$

where $d_{avg} = (D_o + D_i)/2$ and $\rho = (D_o + D_i)/(D_o + D_i)$

Increasing either average diameter, $d_{avg}$, or number of turns, n, generally increases the read range and overall size of the antenna 404 while reducing the response frequency.

The capacitance, C, of the interdigitated capacitor 402 is generally based on the substrate permittivity, $\varepsilon$, trace width, w, space width between the traces, s, metal thickness, t, number of fingers, m, and finger length, $L_f$, and is given by the following equation:

$$C = \left[0.12 \frac{t}{w} + 0.18(1 + \varepsilon)\log_{10}\left(1 + \frac{w}{s}\right)\right] \cdot 2mL_f$$

Capacitor size—determined by w, s, m, and $L_f$—may be constrained by the inner diameter of the loop antenna 404. Increasing the capacitance of the wireless sensor generally decreases the resonant frequency of the sensor.

Figure 5:
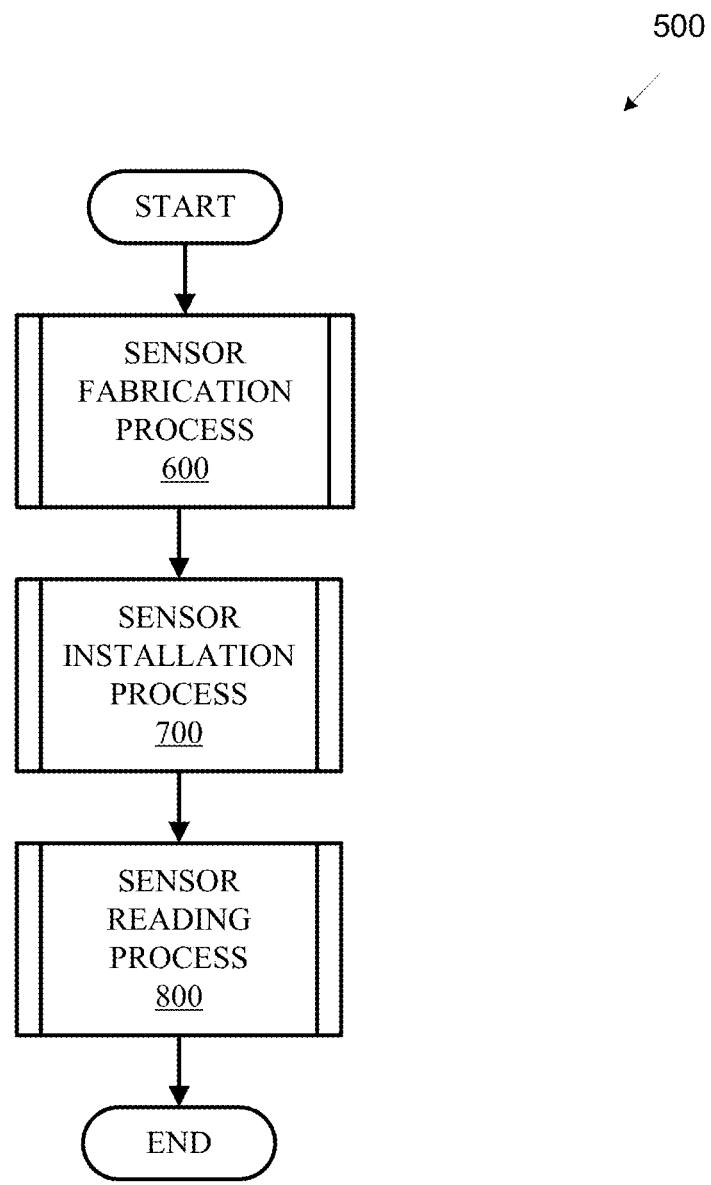
FIG. 5 is a flowchart showing an exemplary wireless sensor-based polymer monitoring process, according to one embodiment of the present disclosure.

Now referring to FIG. 5, an exemplary overview of a wireless sensor-based polymer monitoring process 500 is shown according to one embodiment of the present disclosure. As will be understood by one having ordinary skill in the art, the steps and processes shown in FIG. 5 (and those of all other flowcharts and figures shown and described herein) may operate concurrently and continuously, are generally asynchronous and independent, and are not necessarily performed in the order shown. Generally, the processes may operate on an electronic computing device (e.g., laptop, remote server, sensor device etc.) or may be performed manually. In various embodiments, the process 500 is the process by which wireless sensors (as disclosed herein; e.g., sensors 104 from FIG. 1) are embedded in polymers and used to detect degradation of the structural integrity of the polymers. The process 500, in various embodiments, comprises an exemplary sensor fabrication process 600, an exemplary sensor installation process 700, and an exemplary sensor reading process 800.

In one embodiment, the process 500 begins with process 600, wherein the sensors are fabricated according to specifications determined from their intended use (further details of which will be discussed in association with the description of FIG. 6). In one embodiment, the sensors are fabricated using thin-film processes similar to those employed in flexible circuit board fabrication. Alternative fabrication methods generally comprise those processes used in manufacture of direct write sensor and PCB fabricated sensors. The specific structure of a particular sensor generally depends on the desired information regarding the structural integrity of the polymer (e.g., barrier failure, corrosion, permeation, pitting, temperature, etc.) that the sensor will detect, as well as the polymer and physical location into which it will be embedded.

Continuing, in one embodiment, with the process 700, wherein the wireless sensors are generally embedded into the material that they will monitor (further details of which will be discussed in association with the description of FIG. 7). For example, the sensors may be embedded between the corrosion barrier layer and the structural layer of a polymer container. In one embodiment, as the layers of the polymer container are formed, the wireless sensors are embedded into the container by placing the sensors between two of the layers during vessel construction. In an alternate embodiment, the wireless sensors are embedded by cutting into the wall of an already-constructed container to a predetermined depth, inserting the sensors, and sealing the sensors into the container wall. In one embodiment, the wireless sensors are embedded by placing the sensors onto the wall of an already-constructed container and covering the sensors with a patch that is of a predetermined thickness and material (e.g., the same material and thickness as the corrosion barrier in the vessel).

In one embodiment, continuing with process 800, wherein the embedded sensors are read to determine when the corrosion barrier is no longer efficacious and defective vessels are removed (further details of which will be discussed in association with the description of FIG. 8). In one embodiment, a handheld reader is used to collect data from the sensor (e.g. changes in the structural integrity of the polymer container in which the sensor is embedded). In various embodiments, a handheld reader can be placed on the polymer container for continuous monitoring of the sensor to gather data regarding the structural integrity of the polymer container.

After the process 800, the exemplary wireless sensor-based polymer monitoring process 500 ends thereafter.

Figure 6:
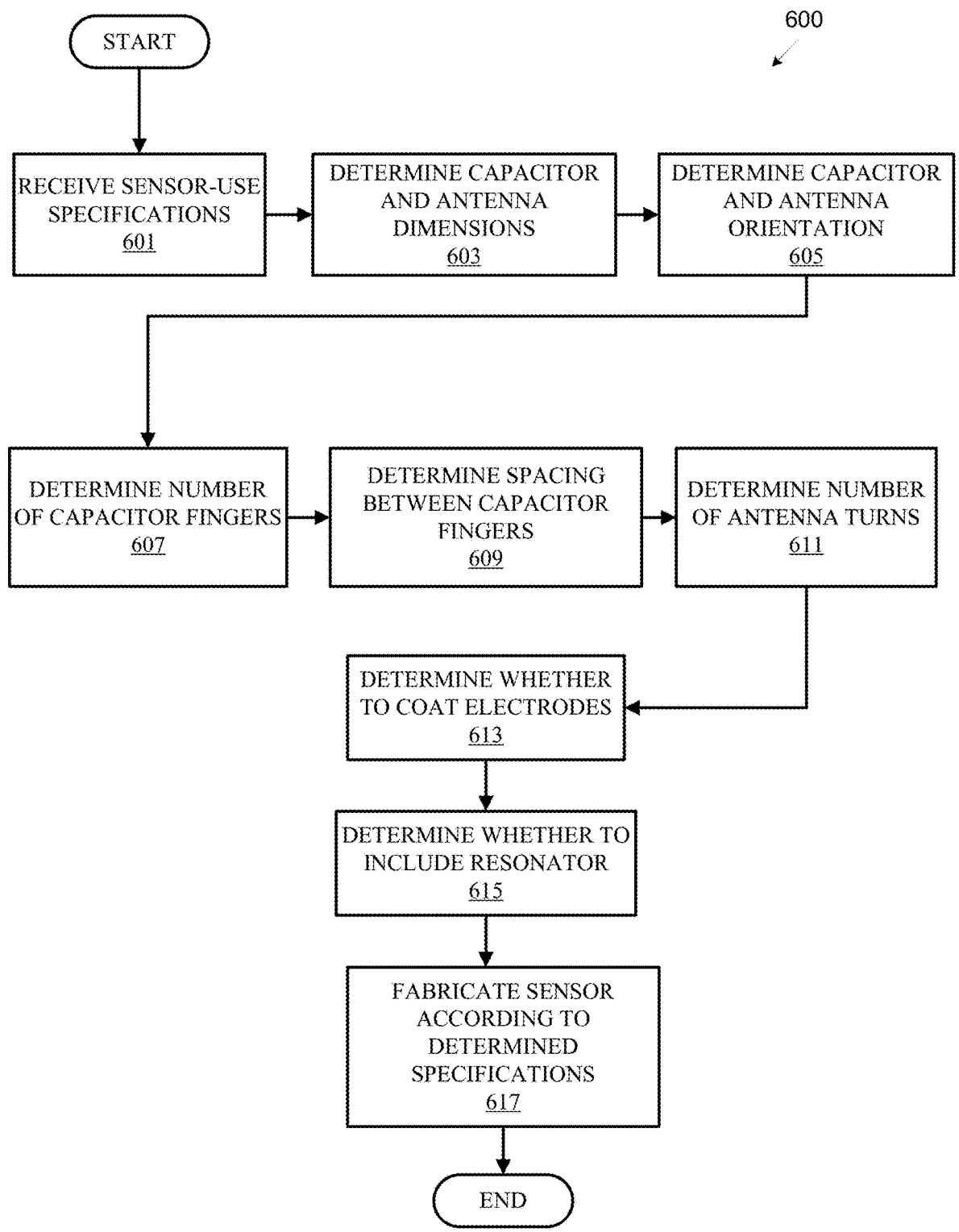
FIG. 6 is a flowchart showing an exemplary sensor fabrication process, according to one embodiment of the present disclosure.

Referring now to FIG. 6, an exemplary sensor fabrication process 600 is shown according to one embodiment of the present disclosure. Generally, the process 600 is the process by which the sensors are fabricated according to specifications determined from their intended use. The performance of a particular sensor can be changed by adjusting various design variables (e.g., capacitor/antenna dimensions or orientation, capacitor fingers, fingers spacing, antenna turns, etc.). In various embodiments, the capacitor (also referred to herein as an "interdigitated capacitor" or "IDC") in the wireless sensor is the most responsive component of the sensor. In various embodiments, the capacitance of the IDC generally changes as the chemical attacks the corrosion barrier. In various embodiments, a planar-spiral antenna is generally the tuning and communication element of the sensor.

In various embodiments, the process 600 begins at step 601, wherein the system receives sensor use specifications. Generally, these use specifications may indicate the specific structural needs or desired information regarding the structural integrity of the polymer container (e.g. barrier failure, corrosion, permeation, pitting, temperature, etc.) that the sensor will detect. In one embodiment, the sensor will use various techniques to measure a change in impedance to detect the presence of chemicals, but other variables such as temperature could also be measured.

Thus, at step 603, in one embodiment, the system determines the dimensions of the capacitor and antenna from the use specifications. As such, the sensor may be sized to transmit data a certain distance, to fit in a specific location, etc. The antenna design, in various embodiments, is based on its inner coil dimension, outer coil dimension, and number of turns. In one embodiment, the inner coil dimension is limited by the overall size of the IDC. Also, increasing the average diameter of the antenna to improve the read range will, in one embodiment, impact the following metrics and hardware by decreasing the response frequency, creating a positive impact on the reader design, and increasing sensor size. Generally, the dimensions of the sensor do not directly impact sensor response to corrosion.

At step 605, in one embodiment, the system determines the orientation of the capacitor and antenna (e.g., whether the capacitor is centered within the antenna, outside of the antenna, etc.) to be compatible with the intended installation location of the sensor. Generally, adjusting the configuration of the antenna (e.g., to one side of or between the capacitor) permits reading of the sensor in confined locations, near metal, through access holes, etc.

In various embodiments, at step 607, the system determines the number of fingers of the capacitor according to the use specifications. Generally, increasing the number of fingers in the capacitive sensor will increase the sensor capacitance, reduce the response frequency, and increase the sensor footprint and measurement region. In one embodiment, at least 2 fingers are used to form a capacitor. In an exemplary embodiment, a 100-finger capacitor at minimum fabrication resolution would form a 1 inch wide capacitor, and an antenna could be patterned around it. At step 609, in one embodiment, the system determines the spacing between capacitor fingers according to the use specifications. In various embodiments, increasing the spacing between the fingers increases the detection range of the sensor into the material in which it is embedded (e.g., permitting faster detection of corrosion or permeation). Increasing the spacing between the fingers also will impact the following metrics and hardware: increasing response frequency, increasing sensor size, and increasing the size of the sensor. In various embodiments, decreasing the spacing between the fingers decreases the detection range of the sensor into the material in which it is embedded (e.g., resulting in a sensor that only detects corrosion or permeation very close to the sensor location), which permits the sensor to be embedded at a specific depth to detect corrosion to that depth.

At step 611, the system determines the number of antenna turns according to the use specifications. In various embodiments, the number of turns generally tune the antenna (given a particular capacitor) to a specific response frequency. In various embodiments, increasing the turns in the antenna will generally increase the inductance, reduce the response frequency, increase inductor resistance, decrease read range if resistive losses are too high, and improve read range if turns improve magnetic coupling. A specific frequency may be desired to avoid conflicting with other sensors embedded within a particular vessel (e.g., such that the data detected regarding the vessel may be determined from the sensor frequency, etc.). Similarly, the sensor frequency may avoid noise or other environmental interference.

In various embodiments, at step 613, the system determines whether to coat the electrodes according to the use specifications. In one embodiment, the electrodes may be surface treated or coated to prevent degradation by the chemical stored in the vessel or detect a specific chemical. At step 615, in one embodiment, the system determines whether to include a resonator in the sensor according to the use specifications. In various embodiments, capacitively-coupled resonators may be used as an identifier for each sensor (e.g., the resonators distinguish between sensors so that the specific type of data collected from the vessel may be determined by the system).

At step 617, the sensor(s) is fabricated according to the specifications determined at steps 603-617. In one embodiment, the sensors are fabricated using thin-film processes similar to those employed in flexible circuit board fabrication. Alternative fabrication methods generally comprise those processes used in manufacture of direct write sensor and PCB fabricated sensors.

After step 617, the exemplary sensor fabrication process 600 ends thereafter.

Figure 7:
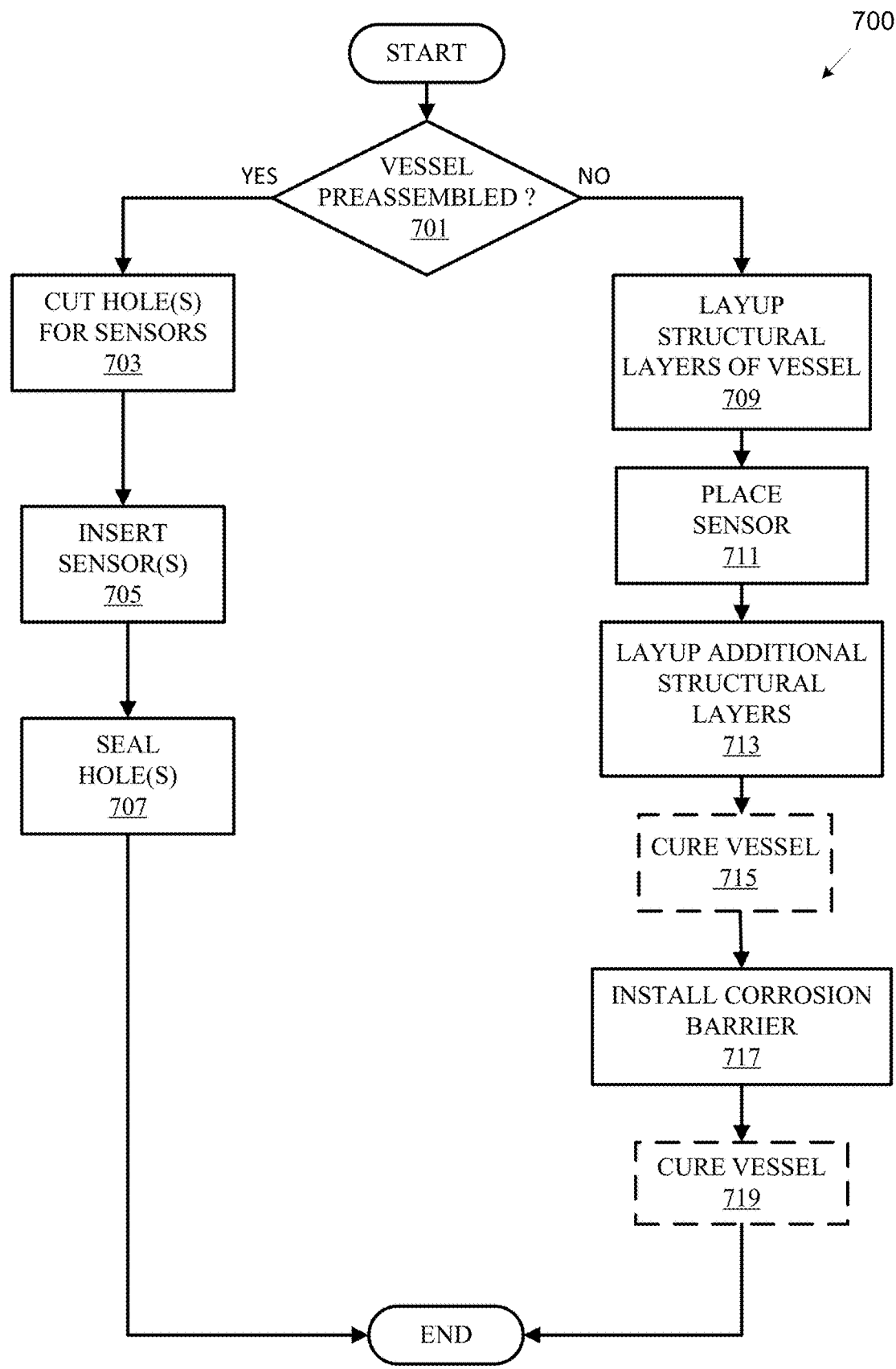
FIG. 7 is a flowchart showing an exemplary sensor installation process, according to one embodiment of the present disclosure.

Now referring to FIG. 7, an exemplary sensor installation process 700 is shown according to one embodiment of the present disclosure. Generally, the wireless sensors are embedded between the corrosion barrier layers and the structural layers of a vessel to detect degradation of the corrosion barrier layer (e.g., potential failure of the vessel).

In various embodiments, the process 700 begins at step 701, wherein the system determines whether the vessel is preassembled.

If the system determines that the vessel is preassembled (at step 701), then, at step 703 in one embodiment, one or more holes are cut into the vessel so that the sensors may be placed inside the hole(s). Generally, the depth of the hole(s) will depend on where in the vessel data is desired to be gathered (e.g., degradation of the corrosion barrier, surface temperature of the vessel, etc.). Further, the size of the hole will depend, in one embodiment, on the size of the sensor to be embedded. At step 705, in various embodiments, the wireless sensor(s) is embedded into the vessel by placing the sensor(s) into the hole(s). At step 707, in one embodiment, the sensors are sealed into the vessel by placing a patch over the hole; the patch may be of the same composition as the vessel, a different composition, etc.

If, however, the system determines that the vessel is not preassembled (at step 701), then, at step 709 in one embodiment, the system begins assembling the vessel by laying up the structural layers of the vessel. For example, the structural layer comprises four layers of chopped strand mat with an epoxy vinyl ester matrix. As will be understood by one having ordinary skill in the art, this disclosure places no limitations on the number of layers or materials of the structural layer. Generally, at step 711, the sensor(s) is placed on the structural layer in predetermined positions. For example, the sensor is placed on top of the fourth layer after being rolled and while the layer is still wet. At step 713, in various embodiments, the sensor is covered with additional layers that are of a predetermined thickness and material (e.g., the same material and thickness as the corrosion barrier in the vessel). For example, a fifth layer of fiber mat is placed on top of the sensor and gently pressed into the lower four layers. At step 715, the vessel walls are optionally cured (e.g., by heat, over time, exposure to sun, exposure to a particular chemical, etc.). In one embodiment, the curing agent is a mixture of peroxide and epoxy vinyl ester that is formulated for maximum corrosion resistance to most chemicals, vapors and fuels. Generally, this disclosure plays no limitations on type the curing agents used for vessel assembly. At step 717, in one embodiment, the corrosion barrier is installed. For example, additional layers (e.g., comprising a chemically-resistant material or compound) are added on top of the fifth layer to complete the corrosion barrier layup. Thus, at step 719, the vessel walls and corrosion barrier are optionally cured (e.g., by heat, over time, exposure to sun, exposure to a particular chemical, etc.) similar to the curing at step 715.

In various embodiments, after steps 707 and 719, the exemplary sensor installation process 700 ends thereafter.

Figure 8:
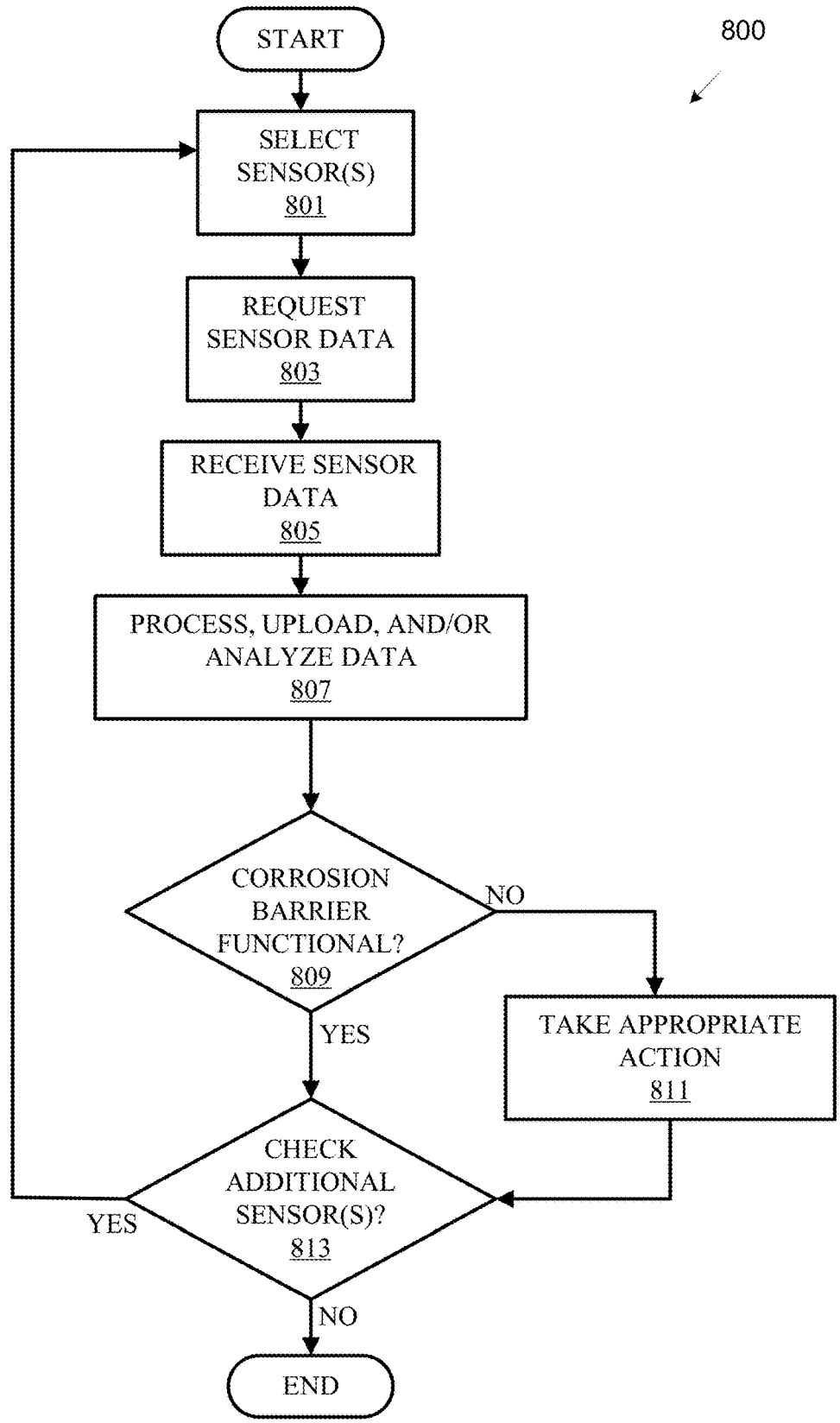
FIG. 8 is a flowchart showing an exemplary sensor reading process, according to one embodiment of the present disclosure.

Now referring to FIG. 8, an exemplary sensor reading process 800 is shown according to one embodiment of the present disclosure. Generally, the process 800 is the process by which the embedded sensors are read to determine when the corrosion barrier is no longer efficacious such that defective vessels are removed. In one embodiment, a handheld reader collects data from the sensor (e.g. changes in the structural integrity of the polymer container in which the sensor is embedded). In various embodiments, a reader can be placed on the container for continuous monitoring of the sensor to gather data regarding the structural integrity of the polymer container. In one embodiment, the reader may be mounted on a drone or other vehicle for autonomous collection of data without requiring the physical presence of a human operator near each sensor.

In various embodiments, the process 800 begins at step 801, wherein the system selects the embedded sensor(s) to be read and analyzed. Generally, this may be done according to a predetermined schedule, manually, randomly, based on historically collected data (e.g., a sensor with a previous reading that suggested the corrosion barrier was failing, etc.), environmental factors (e.g., fire, flood, heatwave, etc.), the number of days in operation, the number of days since the last reading, etc. Thus, at step 803, in various embodiments, the sensor data is requested and, at step 805, the sensor data is received. For example, to collect data from the sensors at steps 803 and 805, in one embodiment, a handheld reader (or a drone-mounted reader or other remotely-controlled reader) within range of a sensor transmits radio frequency power to the sensor, which powers the sensor to transmit data, and then receives the data transmitted by the sensor.

At step 807, the received data is processed, uploaded (to the data management system) and/or analyzed to determine whether the corrosion barrier has failed. Generally, to determine whether the corrosion barrier has failed, the system may assess whether the signal from the sensor has changed, ceased, or fallen past a predetermined threshold. Thus, at step 809, the system determines whether the corrosion barrier is functional. If the corrosion barrier is not functional, then at step 811 the system takes the appropriate action (e.g., flags the sensor for rechecking, flags the vessel for visual inspection, removes the vessel from service, remove the stored chemical, etc.).

In an alternative scenario, instead of a handheld reader, a reader would be permanently installed on the exterior of the vessel for continuous monitoring of the wireless sensors embedded therein, such that one or more of steps 801-811 may be combined together. Generally, the reader could provide an alert (e.g., at step 811) when the readings from the sensor reach a predetermined threshold.

After taking the appropriate action at step 811 or if the corrosion barrier is determined to be functional at step 809, the system determines, in various embodiments, at step 813, whether to check additional sensors. Generally, the system may check all of the sensors in a particular vessel or location or may recheck sensors that gave suspicious readings. Thus, if additional sensors need to be checked, the system returns to step 801 to select the appropriate sensor.

If, however, the system determines, at step 813, that no additional sensors need to be checked, then, in one embodiment, the exemplary sensor reading process 800 ends thereafter.

Exemplary Test Results

Exemplary sample tests were performed on one embodiment of the present disclosure by EngeniusMicro, LLC, of Atlanta, Ga. Experimental validation of the disclosed system, in various embodiments, comprised polymer sample preparation and exposure via three separate testing methodologies. The first testing methodology set a liquid-FRP interface at varying distances from a sensor. The second testing methodology was a submersion or "dunk" test conforming to ASTM Standard C581. The third testing methodology was an Atlas Cell test conforming to ASTM Standard C868.

The first testing methodology provided proof of concept by setting a liquid-FRP interface at varying distances from an exemplary wireless sensor (as disclosed herein). Generally, these tests assumed there were no mixed-materials (e.g., permeated polymer) such that there was either pure FRP or pure chemical solution. Results of these tests are shown in FIGS. 9 and 10.

In the submersion tests, in one embodiment, wireless sensors (as disclosed herein) were embedded into FRP (e.g., as discussed in association with the description of FIG. 7) and completely submerged in either ethylene dichloride ("EDC") or sodium hypochlorite ("NaClO") to simulate exposure to chemicals. The samples were generally exposed to the EDC or NaClO on all surfaces and were removed periodically and measured for weight, thickness, hardness, and sensor frequency changes. In one embodiment, the submersion test samples were generally prepared by hand-laying FRP pieces with an embedded sensor. In one embodiment, the hand layup/manufacturing process used precut sheets of chopped strand mat with an epoxy vinyl ester resin coated and worked into the glass fibers (not shown). The sensor was then, in one embodiment, embedded between layers 4 and 5 of a 5-layer stack of polymer (not shown). In one embodiment, during the submersion test, the samples of FRP were submerged into baths of either EDC or 12-15% NaClO. In various embodiments, samples were removed periodically to measure the weight, thickness, barcol hardness, and sensor response over time. The EDC test was performed at room temperature. The NaClO test was performed at room temperature for days 0 through 68, and 105° F. for days 68 through 92, and 115° F. for days 92 through 234. Measurements generally included the following: weight using a microbalance, thickness using digital calipers, barcol hardness and wireless sensor reading. Results of these tests are found in FIGS. 11-13.

In the Atlas Cell test, in one embodiment, wireless sensors (as disclosed herein) were embedded in FRP (e.g., as discussed in association with the description of FIG. 7) and exposed only on the corrosion barrier surface. The sensor response was generally recorded in-situ via an automated reader during these tests (to simulate the previously-disclosed handheld reader). In one embodiment, the time for the Atlas Cell test was determined based off of the submersion test results. Results of this test are found in FIG. 14.

Figure 9:
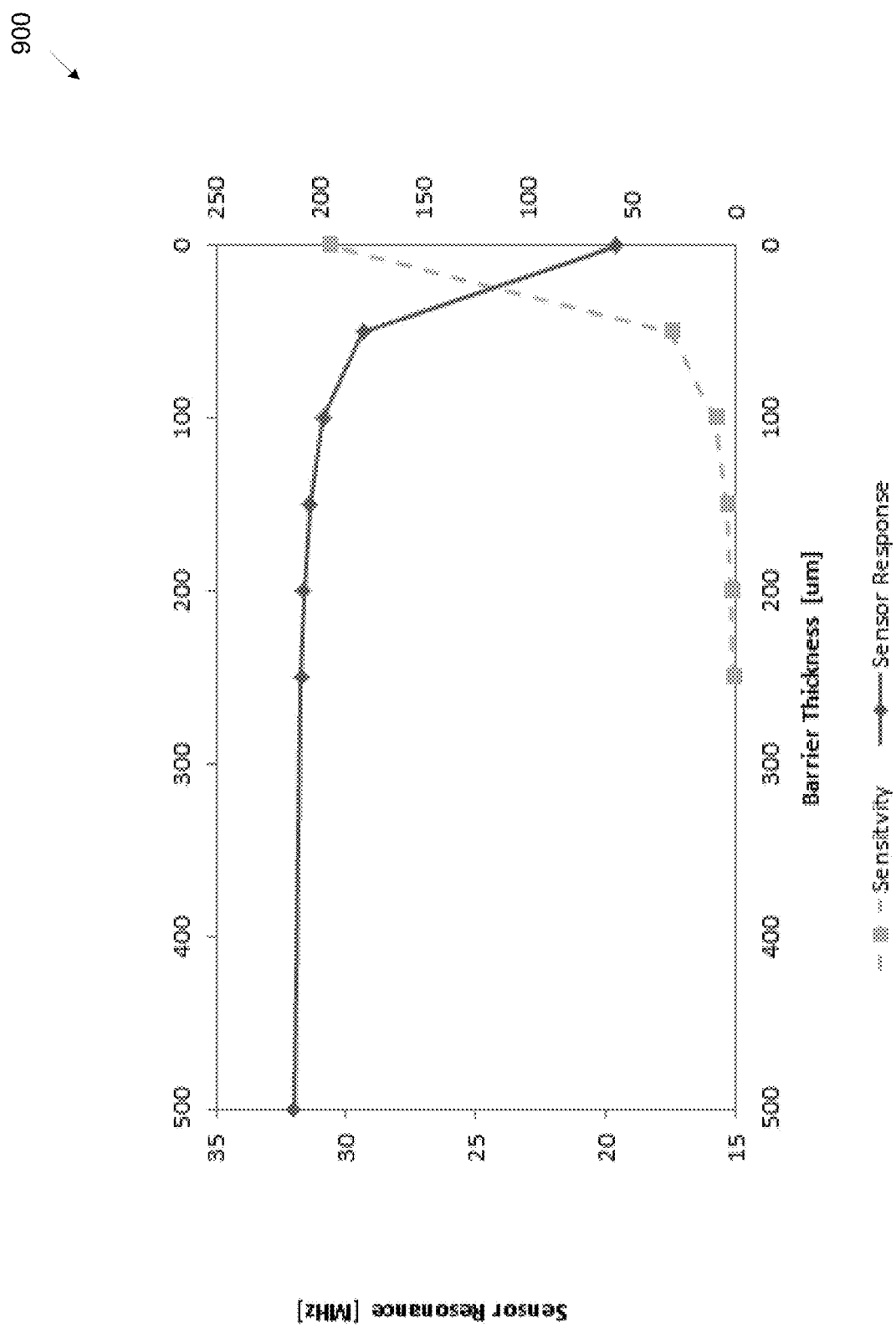
FIG. 9 illustrates exemplary test results of sensor frequency response and sensor sensitivity to barrier thickness for 75 µm capacitor spaces/traces, according to one embodiment of the present disclosure.
Figure 10:
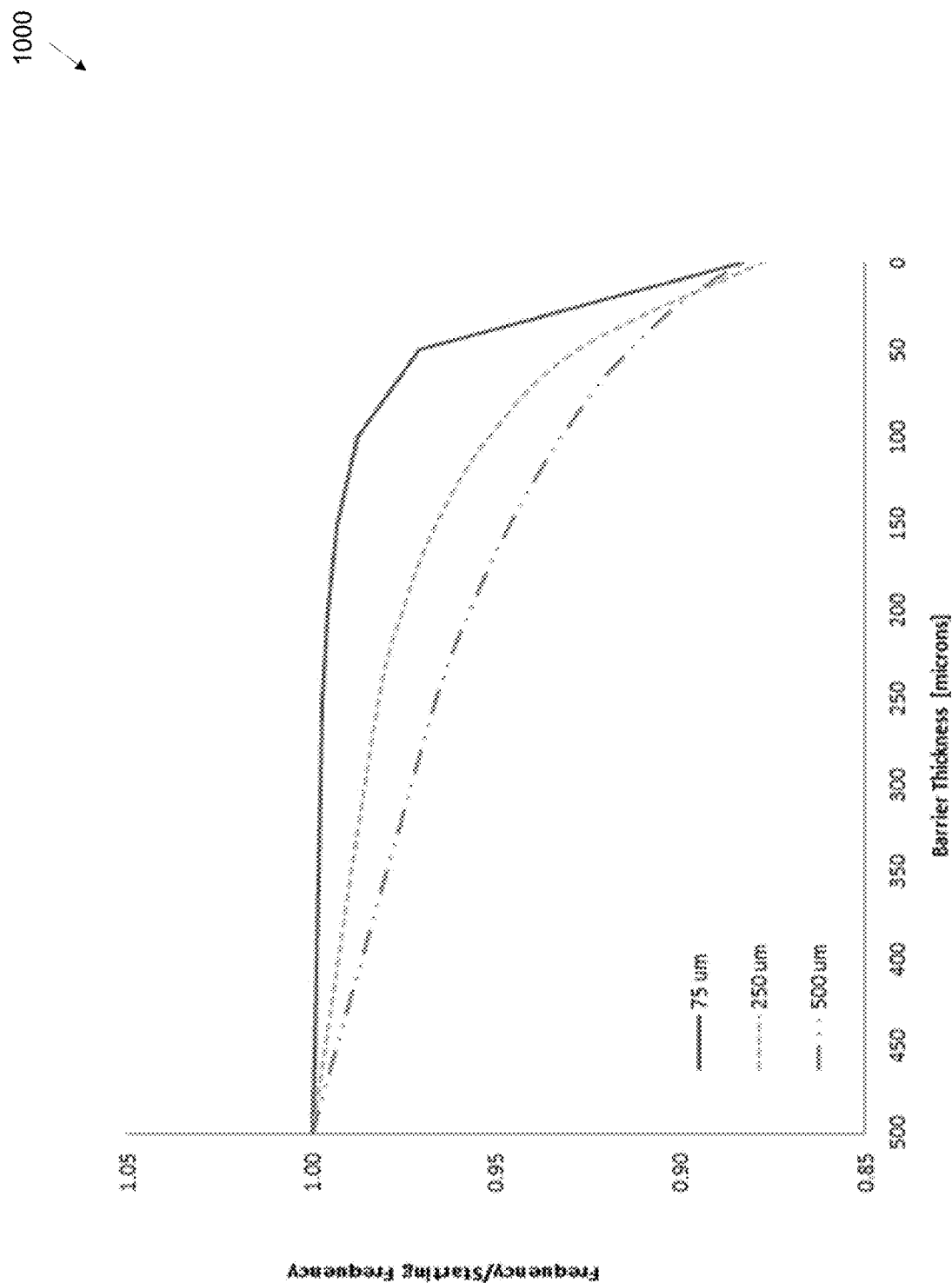
FIG. 10 illustrates exemplary test results of normalized sensor response for capacitor spaces/traces of 75, 250, and 500 µm, according to one embodiment of the present disclosure.

Now referring to FIG. 9, exemplary test results 900 of sensor frequency response and sensor sensitivity to barrier thickness for 75 μm capacitor spaces/traces are shown according to one embodiment of the present disclosure. Generally, the sensor exhibited nearly constant response from 500 to 100 μm barrier thickness (e.g., distance to the liquid-FRP interface) and then rapid decline in sensor resonance when the chemical was less than 100 μm from the sensor. This "knee" generally indicates the presence of the chemical, and the position of the knee generally indicates the sensing range of the sensor (e.g., how far away from the sensor chemicals may be detected). The sensitivity (e.g., the slope of the response curve) suggests that, in one embodiment, a practical inexpensive reader, with 100 kHz resolution at 30 MHz, could detect chemical permeation within 0 to 50 μm of the sensor for this design.

Referring now to FIG. 10, exemplary test results 1000 of normalized sensor response for capacitor spaces/traces of 75 μm, 250 μm, and 500 μm are shown according to one embodiment of the present disclosure. In one embodiment, the stimulation results generally reveal 5% frequency shifts at 40, 100, and 160 μm, respectively, which indicates that increasing the space/trace dimensions of the capacitor will generally increase the sensing range.

Figure 11A:
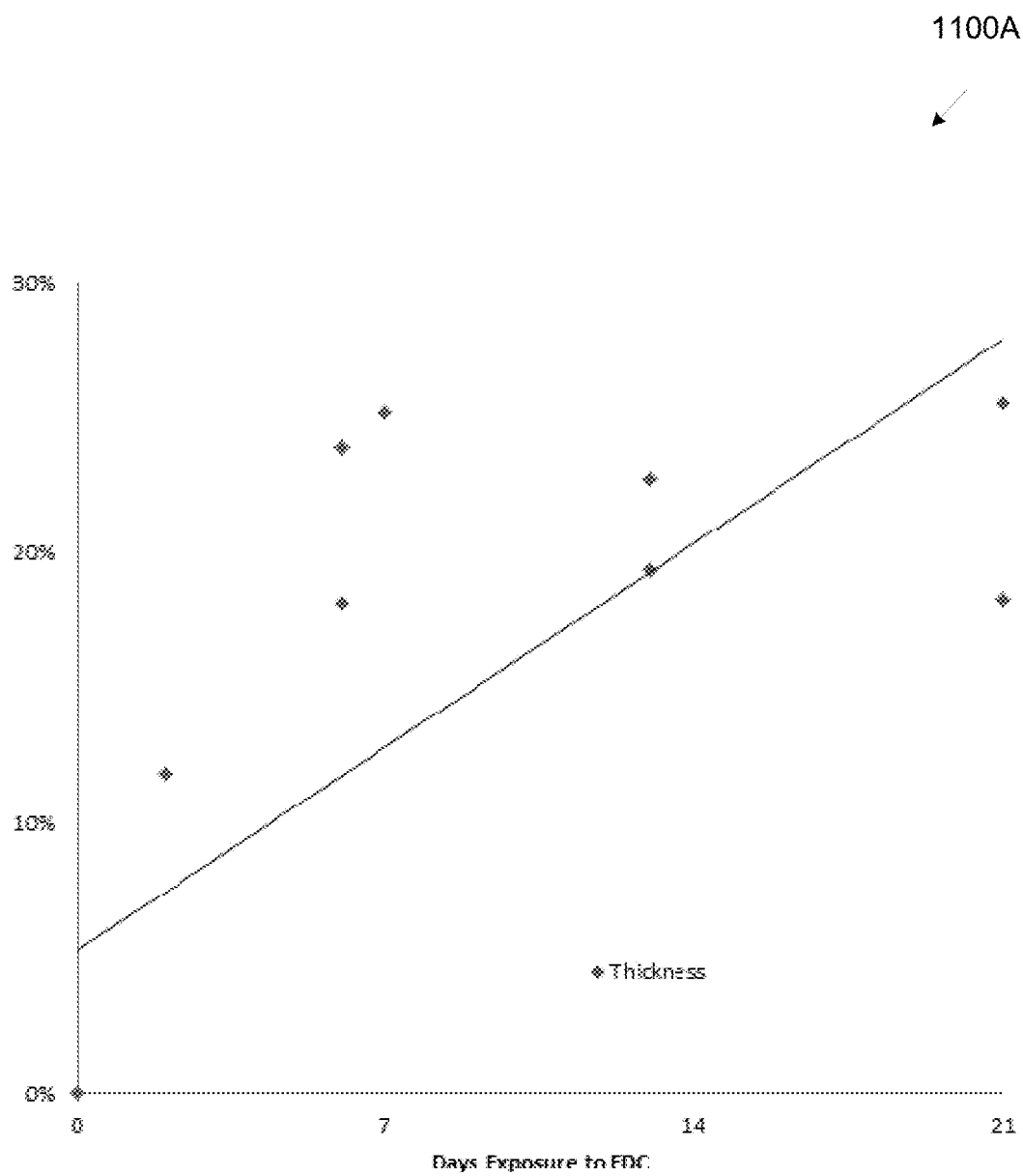
FIG. 11 (consisting of FIGS. 11A and 11B) illustrates exemplary test results of percent thickness change and percent mass and hardness change, respectively, after submersion in EDC, according to one embodiment of the present disclosure.
Figure 11B:
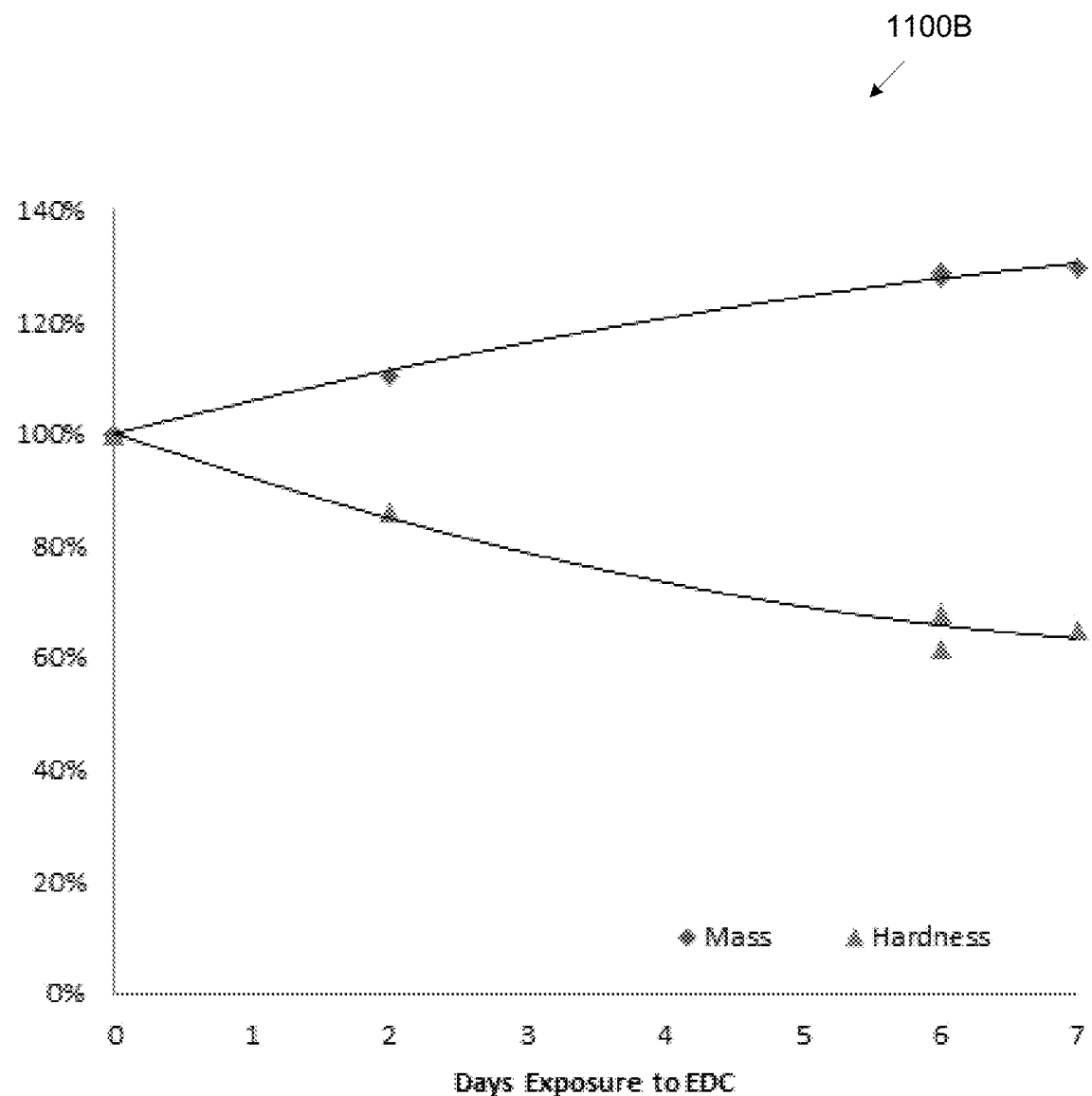

Now referring to FIG. 11 (consisting of FIGS. 11A and 11B), exemplary test results 1100A of percent thickness change and test results 1100B of percent mass and hardness change after submersion in EDC are shown according to one embodiment of the present disclosure. In one embodiment, the hardness and thickness were generally calculated by taking 12 separate readings, discarding the highest and lowest values, and averaging the remaining ten. Hardness measurements were generally taken at four points near the center, four points near the corners, and four points near the sides. Thickness readings were generally taken ½" inboard from the four corners, the midpoint of the four sides, and at a non-specific point along each side.

Generally, the tests were run concurrently with each sample in its own EDC bath. It was generally observed that the rate of change of thickness, mass, and hardness in the first 6 days was much greater than the rate of change from day 6 to 21, so two more samples, 4 and 5, were made to capture these initial transient effects of EDC. Visual inspections of EDC-exposed samples showed significant discoloration at 21 days (not shown). Strands of glass were clearly released from the roughened side of the FRP and blisters had formed on two samples. The samples exposed were noticeably thicker, softer, and heavier than unexposed samples.

Mass, hardness, and thickness measurements changed rapidly in the first 7 days before leveling off, showing relatively little change for the days 7 through 21, which may be attributed to EDC permeation into the FRP sample for the first several days before saturating the sample. In various embodiments, these measurement results are generally for submerged sensors removed from EDC and immediately measured. Several months after exposure, the samples were sectioned, polished, and imaged (not shown). By this time the thickness and hardness had rebounded to near the original state because the EDC absorbed into the material during submersion off-gassed after exposure. Nevertheless, signs of EDC damage were generally observed by the evolution of small pores at the sensor interface with the resin.

Figure 12:
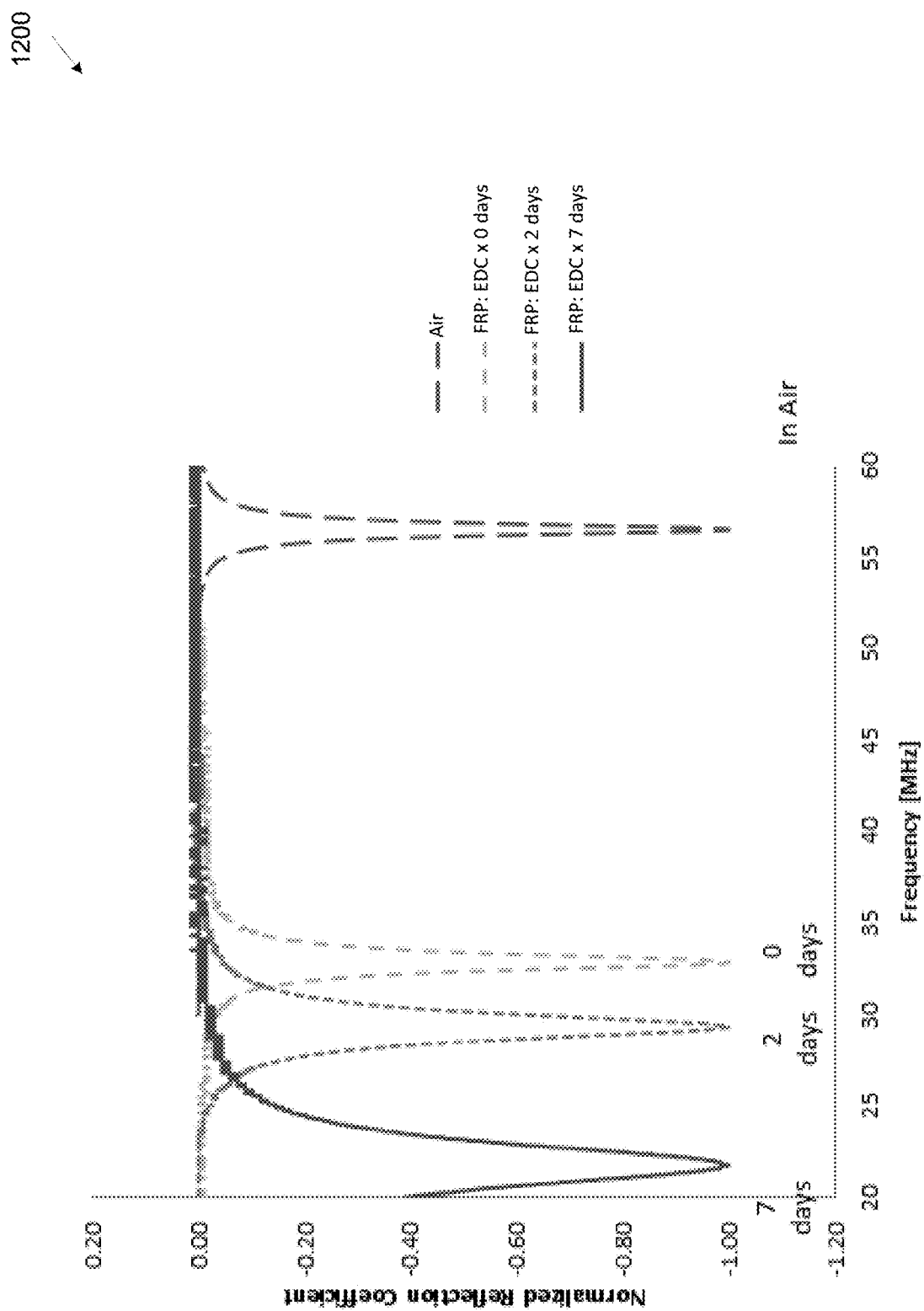
FIG. 12 illustrates exemplary test results of sensor response to submersion in EDC, according to one embodiment of the present disclosure.

Referring now to FIG. 12, exemplary test results 1200 of sensor response to submersion in EDC are shown according to one embodiment of the present disclosure. In various embodiments, wireless sensors that were exposed to ethylene dichloride and sodium hypochlorite showed definitive response to corrosion barrier permeation and chemical attack, with a shift in sensor resonance occurring between days 2 and 7 (with resonance in air vs. day 0 acting as controls). Electrostatic simulations show sensor designs, in various embodiments, are possible to increase sensing range or sensitivity as needed. Sensor data can also be used, in various embodiments, to determine corrosion rates and remaining barrier thickness based on transient sensor data. Also, multiple sensors may be co-located within a single polymer container, in various embodiments, (e.g., at different depths in relationship to the corrosion barrier) to track corrosion barrier changes to the resin while maintaining high sensitivity to chemical attack.

Figure 13:
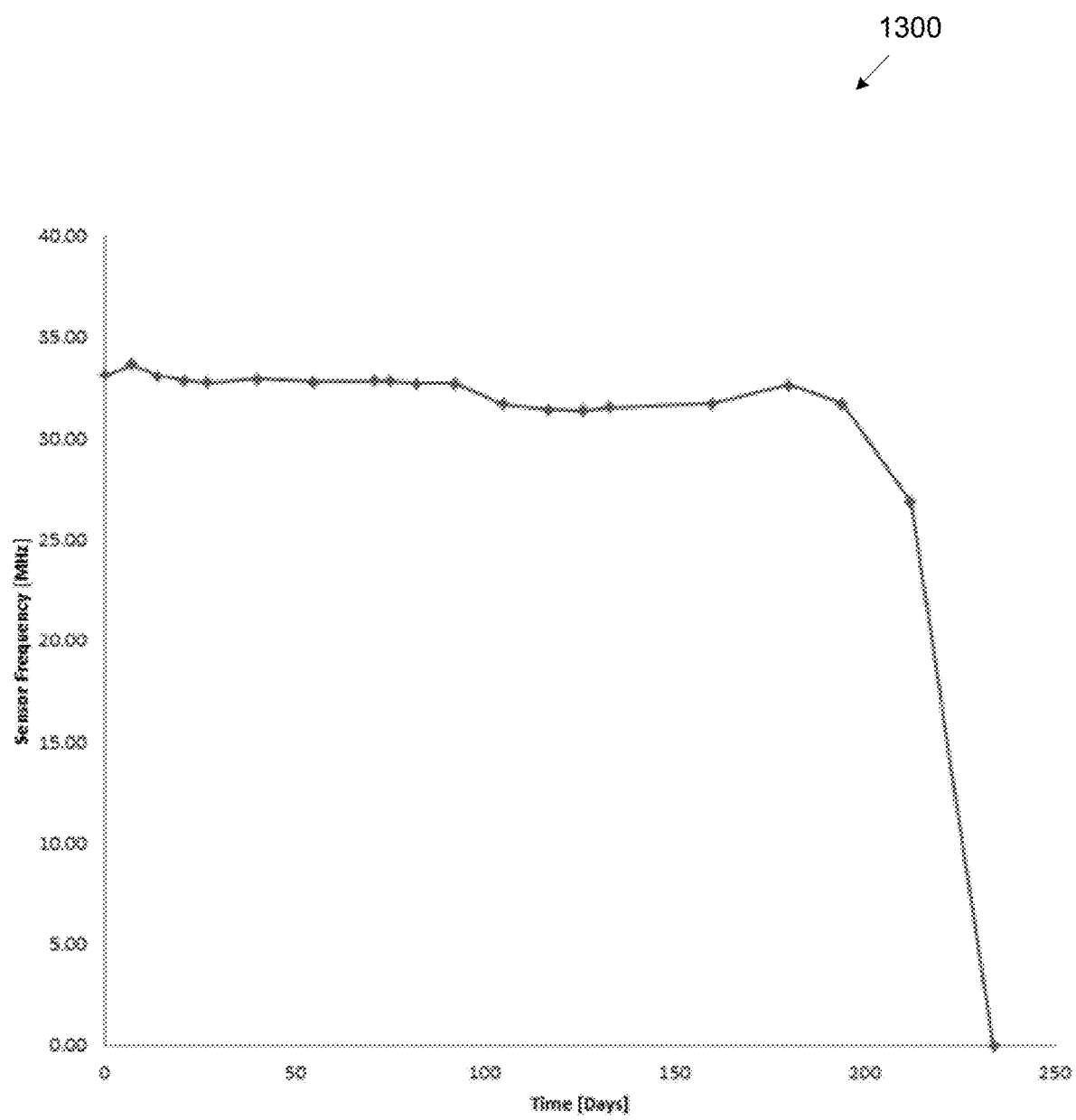
FIG. 13 illustrates exemplary test results of sensor response to submersion in NaClO, according to one embodiment of the present disclosure.

Now referring to FIG. 13, exemplary test results 1300 of sensor response to submersion in NaClO are shown according to one embodiment of the present disclosure. The sensor generally registered the presence of NaClO at day 212 (e.g., approximately −18% frequency shift) and failed to respond on day 234. Visual inspection of the submerged sample (not shown) generally depicted green discoloration on sections of the sensor and antenna due to copper corrosion, which likely caused a resonance shift by passivating portions of the electrode. Corrosion of the antenna would also break conductivity and cause the sensor to cease responding.

Figure 14:
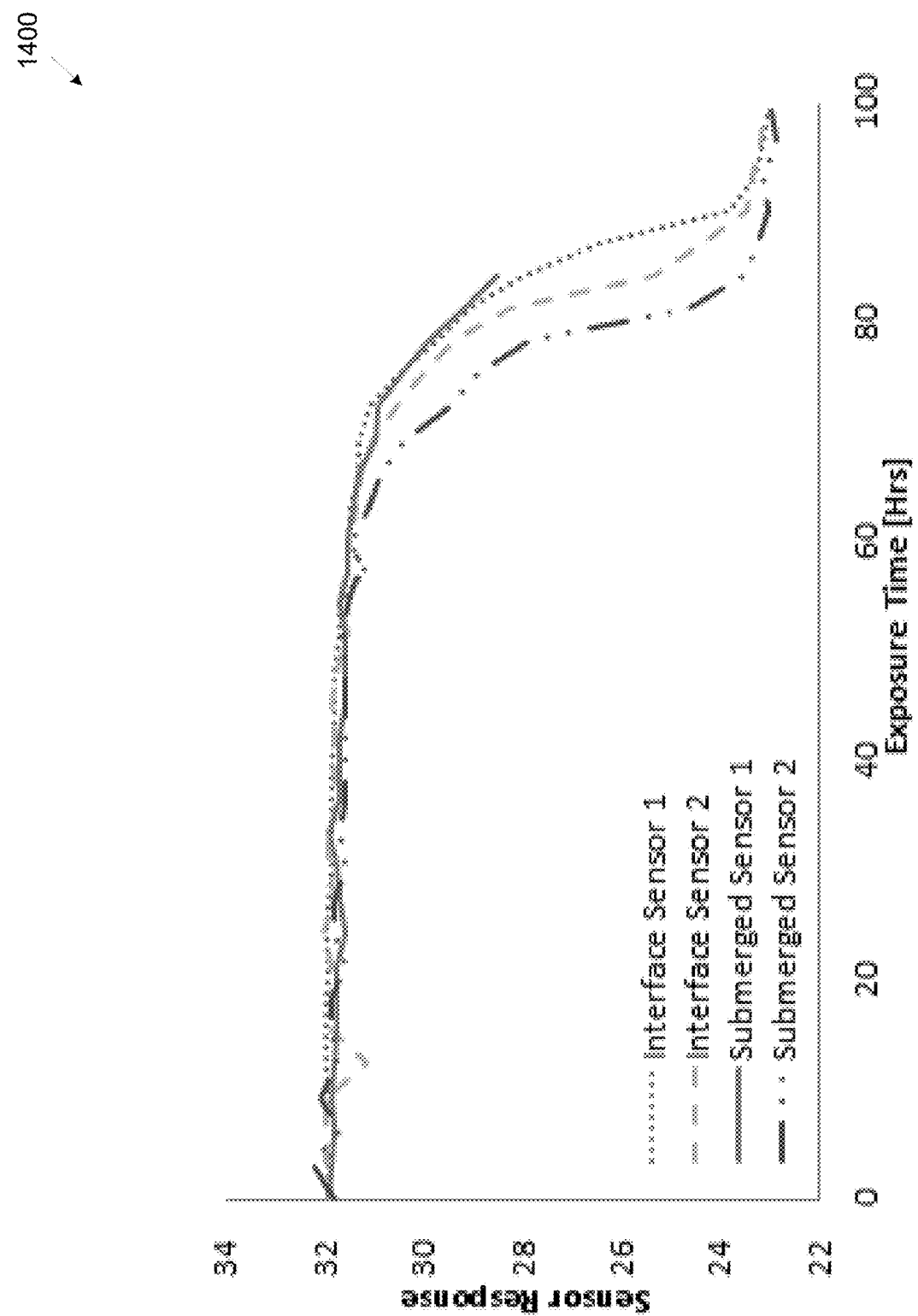
FIG. 14 illustrates exemplary test results of sensor response to Atlas Cell EDC exposure, according to one embodiment of the present disclosure.

Referring now to FIG. 14, exemplary test results 1400 of the embedded sensor response to Atlas Cell EDC exposure are shown according to one embodiment of the present disclosure. In various embodiments, the exposed sample readings at time zero agree with the baseline readings taken before installation, which indicates that the sensor does not respond to the EDC at the FRP surface. The embedded sensor did, however, begin to respond to the EDC permeation after 60 hours and the frequency response became steady again after 90 hours' exposure, which demonstrates signaling of permeation/failure of the corrosion barrier.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

What is claimed is:

1. A system for monitoring structural integrity of a polymer container storing or transporting a fluid, comprising:
   the polymer container, wherein the polymer container comprises at least one wall having at least two layers, the at least two layers comprising a structural layer and a corrosion barrier; and
   one or more sensors embedded within the at least one wall of the polymer container at an interface between the structural layer and the corrosion barrier, wherein each of the one or more sensors comprises:
   a chemically-sensitive capacitor; and
   an antenna comprising a particular resonance frequency,
   wherein each of the one or more sensors responds to close proximity of the fluid by changing the particular resonance frequency or ceasing to transmit at the particular resonance frequency.

2. The system of claim 1, wherein each of the one or more sensors consists of the chemically-sensitive capacitor and the antenna.

3. The system of claim 1, wherein each of the one or more sensors comprises an LC resonant sensor or a RFID wireless sensor.

4. The system of claim 1, wherein each of the one or more sensors is configured to detect high dielectric gradients of the fluid.

5. The system of claim 1, wherein each of the one or more sensors is configured to detect a change in impedance of the polymer container.

6. The system of claim 1, wherein each of the one or more sensors is configured to measure failure of a corrosion barrier of the polymer container, corrosion of the polymer container, permeation of the polymer container, pitting of the polymer container, or temperature of the polymer container.

7. The system of claim 1, wherein the polymer container comprises polytetrafluoroethylene ("PTFE") or fiberglass reinforced polymers.

8. The system of claim 1, wherein the polymer container comprises a storage container, a barrel, a fuel tank, or a pipe.

9. The system of claim 1, further comprising a reader for detecting the particular resonance frequency, wherein the reader is hand-held, permanently mounted on the polymer container, or mounted on a remote sensing device.

10. The system of claim 1, wherein each of the one or more sensors is less than 0.01 inches thick.

11. The system of claim 10, wherein each of the one or more sensors is less than 0.005 inches thick.

12. The system of claim 11, wherein each of the one or more sensors covers a surface area less than 2.0 in$^2$.

13. The system of claim 12, wherein each of the one or more sensors covers a surface area less than 1.0 in$^2$.

14. The system of claim 13, wherein the chemically-sensitive capacitor and the antenna comprise approximately 0.001 inch-thick copper conductors.

15. The system of claim 14, wherein the particular resonance frequency of the antenna in air is less than 70 MHz.

16. The system of claim 15, wherein the particular resonance frequency of the antenna in air is approximately 50 MHz.

17. The system of claim 1, wherein the fluid comprises hydrofluoric acid, sulfuric acid, oleum, phosgene, hydrochloric acid, nitric acid, ammonia, bases, oxidizing and reducing acids, organic compounds, or a mixture thereof.

18. A method for monitoring structural integrity of a polymer container storing or transporting a chemical, comprising:
   accessing one or more sensors in the polymer container, wherein the one or more sensors are embedded within at least one wall of the polymer container, the at least one wall comprising a structural layer and a corrosion barrier, and wherein the one or more sensors are embedded at an interface between the structural layer and the corrosion barrier, wherein each of the one or more sensors comprises:
   a chemically-sensitive capacitor; and
   an antenna comprising a particular resonance frequency,
   wherein each of the one or more sensors responds to close proximity of the chemical by changing the particular resonance frequency or ceasing to react at the particular resonance frequency; and
   reading each of the one or more sensors to detect whether the particular resonance frequency has changed or whether at least one of the one or more sensors has ceased to react at the particular resonance frequency.

19. The method of claim 18, wherein each of the one or more sensors consists of the chemically-sensitive capacitor and the antenna.

20. The method of claim 18, wherein each of the one or more sensors comprises an LC resonant sensor or a RFID wireless sensor.

21. The method of claim 20, wherein the RFID wireless sensor is interrogated by an RF signal in a determined frequency band that is independent of the particular resonance frequency.

22. The method of claim 21, wherein the RFID wireless sensor is interrogated by the RF signal using wave propagation.

23. The method of claim 22, wherein the determined frequency band comprises 840-930 MHz.

24. The method of claim 21, wherein the RFID wireless sensor is interrogated by the RF signal using inductive coupling.

25. The method of claim 24, wherein the determined frequency band comprises 125 kHz, 134.2 kHz, or 13.56 MHz.

26. The method of claim 18, wherein each of the one or more sensors is configured to detect high dielectric gradients of the fluid.

27. The method of claim 18, wherein each of the one or more sensors is configured to detect a change in impedance of the polymer container.

28. The method of claim 18, wherein each of the one or more sensors is configured to measure failure of a corrosion barrier of the polymer container, corrosion of the polymer container, permeation of the polymer container, pitting of the polymer container, or temperature of the polymer container.

29. The method of claim 18, wherein the polymer container comprises fiberglass reinforced polymers and a chemically-resistant liner, wherein the chemically-resistant liner comprises polytetrafluoroethylene ("PTFE"), perflyoroalkoxy ("PFA"), ethylene tetra fluoro ethyleye ("ETFE"), polypropylene ("PP"), high-density polyethyleye ("HDPE"), or chemically-resistant resins.

30. The method of claim 18, wherein the polymer container comprises a storage container, a barrel, a fuel tank, or a pipe.

31. The method of claim 18, further comprising the step of, prior to accessing the one or more sensors, embedding the one or more sensors in the polymer container at the interface between the corrosion barrier and the structural layer.

32. The method of claim 18, wherein reading each of the one or more sensors further comprises reading each of the one or more sensors with a reader for detecting the particular resonance frequency, wherein the reader is hand-held, permanently mounted on the polymer container, or mounted on a drone.

33. The method of claim 32, wherein data transfer between the reader and each of the one or more sensors occurs via backscatter.

34. The method of claim 32, wherein data transfer between the reader and each of the one or more sensors occurs via load modulation.

35. The method of claim 18, wherein each of the one or more sensors is less than 0.01 inches thick.

36. The method of claim 35, wherein each of the one or more sensors is less than 0.005 inches thick.

37. The method of claim 36, wherein each of the one or more sensors covers a surface area less than 2.0 in$^2$.

38. The method of claim 37, wherein each of the one or more sensors covers a surface area less than 1.0 in$^2$.

39. The method of claim 38, wherein the chemically-sensitive capacitor and the antenna comprise approximately 0.001 inch-thick copper conductors.

40. The method of claim 39, wherein the particular resonance frequency of the antenna in air is less than 70 MHz.

41. The method of claim 40, wherein the particular resonance frequency of the antenna in air is approximately 50 MHz.

42. The method of claim 18, wherein the chemical comprises hydrofluoric acid, sulfuric acid, oleum, phosgene, hydrochloric acid, nitric acid, ammonia, bases, oxidizing and reducing acids, organic compounds, or a mixture thereof.

* * * * *